United States Patent
Tornar

(10) Patent No.: US 6,829,215 B2
(45) Date of Patent: Dec. 7, 2004

(54) IP MULTI-HOMING

(75) Inventor: Massimiliano Tornar, Lachine (CA)

(73) Assignee: Marconi Intellectual Property (Ringfence) Inc., Warrendale, PA (US)

( * ) Notice: Subject to any disclaimer, the term of this patent is extended or adjusted under 35 U.S.C. 154(b) by 234 days.

(21) Appl. No.: 09/817,993

(22) Filed: Mar. 27, 2001

(65) Prior Publication Data

US 2002/0186654 A1 Dec. 12, 2002

Related U.S. Application Data

(60) Provisional application No. 60/244,630, filed on Oct. 31, 2000.

(51) Int. Cl.[7] ............................................. G06F 11/00
(52) U.S. Cl. ................................ 370/223; 370/403
(58) Field of Search ............................... 370/216, 225, 370/397, 399, 403, 409, 217, 221, 222, 223, 224

(56) References Cited

U.S. PATENT DOCUMENTS

| | | | | |
|---|---|---|---|---|
| 4,276,637 A | * | 6/1981 | Le Dieu | 370/217 |
| 5,179,548 A | * | 1/1993 | Sandesara | 370/222 |
| 5,187,706 A | * | 2/1993 | Frankel et al. | 370/217 |
| 5,406,255 A | * | 4/1995 | Fujimoto et al. | 340/522 |
| 5,663,950 A | * | 9/1997 | Lee et al. | 370/224 |
| 5,793,745 A | * | 8/1998 | Manchester | 370/224 |
| 5,838,924 A | * | 11/1998 | Anderson et al. | 709/239 |
| 5,948,108 A | * | 9/1999 | Lu et al. | 370/216 |
| 5,963,540 A | | 10/1999 | Bhaskaran | |
| 6,392,990 B1 | * | 5/2002 | Tosey et al. | 370/218 |
| 6,530,032 B1 | * | 3/2003 | Shew et al. | 714/4 |

OTHER PUBLICATIONS

Yang, Y.Y.; Sankar, R.; Automatic failure isolation and reconfiguration [ring networks] □□IEEE Network, vol.: 7 Issue: 5, Sep 1993; pp.: 44–53□□.*

Klaus Peter May, Pierre Seman, Yonggang Du; Christoph Hermann, "A Fast Resotration System for ATM–Ring–Based LANs"; 2460 IEEE Communications Magagine, Sep. 33, (1995), No. 9, New York; pp. 90–98.

* cited by examiner

*Primary Examiner*—Chi Pham
*Assistant Examiner*—Keith M. George
(74) *Attorney, Agent, or Firm*—Jones Day

(57) ABSTRACT

A method and system for providing a customer network with high speed access to a carrier network is provided. The system comprises an access device for providing a communication path for the customer network, a first concentrator device that is operable to establish a communication path with the carrier network, and a second concentrator device that is operable to establish a communication path with the carrier network. The access device is operable to receive data traffic from the customer network and to forward the data traffic within the system. The access device and the first concentrator device cooperate to form a first virtual channel for allowing data traffic to flow from the customer network to the carrier network and from the carrier network to the customer network and wherein the first virtual channel is the primary communication channel for the customer network. The access device and the second concentrator device cooperate to form a second virtual channel for allowing data traffic to flow from the customer network to the carrier network and from the carrier network to the customer network and wherein the second virtual channel is a backup communication channel for the customer network. The system is operable to switch the primary communication channel from the first virtual channel to the second virtual channel upon detection of a failure in the first virtual channel.

32 Claims, 16 Drawing Sheets

IP MULTI-HOMING

This application claims the benefit under 35 U.S.C. §119(e) to U.S. Provisional Patent Application No. 60/244630 entitled "IP Multi-Homing" and filed on Oct. 31, 2000. This application also incorporates U.S. Provisional Patent Application No. 60/244630 by reference as if fully rewritten here.

BACKGROUND OF THE INVENTION

1. Field of the Invention

The present invention is directed toward the field of data communication networks. In particular, the invention is directed to a system and method for providing protected communication paths between a LAN and a carrier network.

2. Description of the Related Art

FIG. 1 sets forth a schematic drawing of a communication system 2 that provides a user or a user's local area network 3 ("LAN") with access to the internet or some other wide area network ("WAN"). In the embodiment shown, a LAN 3 is provided with internet access through a fiber optic system 4. The fiber optic system 4 provides a connection between the user LAN 3 and an internet access device such as an internet backbone router 5 ("BR"). The BR 5 has a number of ports (not shown) with internet protocol ("IP") addresses assigned thereto. Internet access is achieved through accessing the ports on the BR 5.

The preferred user LAN 3 is an Ethernet LAN but other LAN types such as token ring, FDDI, etc., could be used. LAN Hosts 7b preferably are personal computers ("PCs") but optionally could be servers or other computer or communication equipment. LAN router 7a preferably comprises computer or communication hardware that forwards data from or to other computer or communication equipment on the LAN 3. LAN router 7a optionally could be coupled to other subnets (not shown) on the user's premises which interconnect other LAN hosts (not shown).

FIG. 2 sets forth a more detailed view of an exemplary communication system 2 for providing a plurality of user LANs 3 with access to the internet or other WAN via a fiber optic system. The exemplary communication system 2 includes a fiber optic system that preferably is arranged in a ring network 10 and more preferably in a Synchronous Optical Network ("SONET") or SDH ring. The communication system 2 also includes a plurality of network nodes 12a, 12b, 12c, & 12d that are coupled together in the SONET/SDH ring 10, a plurality of local or user LANs 3a, 3b & 3c that are coupled to the network nodes 12a, 12b & 12c, respectively, preferably via fiber optic cables 15, and an internet or WAN access device 5 such as an internet backbone router ("BR") coupled to network node 12d.

FIG. 3 sets forth a system diagram of a preferred SONET/SDH ring 20 for use in a communication system that practices the present invention. The SONET/SDH ring 20 includes a plurality of network nodes 22, labeled N0–N3, coupled in a ring structure by one or more communication paths 24A, 24B. As shown in FIG. 3, the two paths 24A, 24B transport SONET/SDH data streams (many packets/cells) in opposite directions about the ring (i.e., east and west). The communication paths 24A, 24B are preferably fiber optic connections (in SONET/SDH), but could, alternatively be electrical paths or even wireless connections (in other types of ring networks). In the case of a fiber optic connection, paths 24A, 24B could be implemented on a single fiber 24, on dual fibers 24A, 24B, or some other combination of connections. Each network node 22 is preferably coupled to two other network nodes 22 in the ring structure 20. For example, network node N0 is coupled to network nodes N1 and N3. The coupling between the nodes in FIG. 3 is two-way, meaning that each node 22 transmits and receives data (packets/cells) to and from each of the two other nodes 22 to which it is connected. Each network node 22 includes at least two transmitter/receiver interfaces, one for each connection to another node 22. The network nodes 22 could be many types of well-known network devices, such as add-drop multiplexers ("ADMs"), switches, routers, cross-connects or other types of devices. The devices 22 shown in FIG. 3 are preferably ADMs. An ADM is a three terminal device having a local add/drop interface, an upstream network node interface, and a downstream network node interface. These ADMs 22 are coupled to local nodes 26, and are used to add packets/cells from the local nodes 26 to the SONET/SDH data stream, and conversely to drop packets from the SONET/SDH data stream to the local nodes 26. A system and method for packet transport in a SONET/SDH ring network and an exemplary ADM is described in more detail in commonly-assigned U.S. patent application Ser. No. 09/378,844 ("the '844 application"), which is incorporated herein by reference. For more information on SONET/SDH formats, line-speeds, and theory of operation, see John Bellamy, *Digital Telephony*, 2d Edition (1991), pp. 403–425.

The network nodes 22 shown in FIG. 3 may be logically connected by a plurality of virtual paths that coexist on the physical network connection(s) 24. Virtual paths are also known as logical paths or "pipes." For example, although there is only one physical connection from node N0 to node N1 to node N2, there may be numerous virtual paths between these nodes, such as one virtual path from N0 to N1, another from N0 to N2 and another from N1 to N2. Each virtual path may include a plurality of virtual channels, wherein each virtual channel transports packets (or cells) formatted according to the SONET/SDH SPE. The use of virtual paths in SONET/SDH ring networks is described in more detail in commonly-assigned U.S. Pat. No. 6,594,232, which also is incorporated herein by reference.

In the exemplary communication system 2 shown in FIG. 2, the network nodes 12a, 12b & 12c are access nodes. The network devices that make up access nodes 12a, 12b & 12c each include an access device or access card ("AC") 14. Each access card 14 is operable to transfer data packets between a user's equipment on a LAN 3 and other nodes 12 on the ring network 10. The access cards 14 of the present invention may physically reside within a network device of the SONET/SDH ring 10 or alternatively may be coupled to a network device.

The network node 12d of the exemplary communication system 2 is an internet gateway node and the network device that makes up the gateway node 12d includes a multiplexor device or concentrator card ("CC") 16. The CC 16 functions as a switch that multiplexes data packets transmitted by the access nodes 12a, 12b & 12c onto a single data transmission channel 18 for further routing to the internet access device 5. The CC 16 also functions as a switch for forwarding data packets received over the data transmission channel 18 from the internet access device 5 to one or more access nodes 12a, 12b or 12c.

Router ports have been configured for shared use between multiple virtual circuits and sub-interfaces. The concentrator card 16 facilitates the shared use of a router port and has a two-fold role. The concentrator card 16 merges the data from the various LANs 3 and access cards 14 on the ring network into a single pipe for forwarding to the single router port of the BR 5 to which the concentrator card 16 is coupled. In merging the data, the concentrator card 16 couples the data to different interfaces within the router port. The concentrator card's 16 second task is to take data from the BR 5, packet by packet, and forwards the data to the various access nodes 12 on the ring network.

Each access card 14 includes at least one protocol engine 30, as shown in FIG. 4, for providing a fiber extended router port 6 to a LAN 3. The protocol engine 30 provides a permanent address for use by the LAN devices 7 when transmitting data packets to the WAN. The protocol engine 30 reformats data packets from the LAN devices 7 and transmits the reformatted data packets over the ring 10 through the concentrator interface of CC 16 to a sub-interface of BR 5. The protocol engine 30 also receives data packets from a sub-interface of BR 5 through the concentrator interface and reformats those data packets to the format used on the LAN 3. The protocol engine 30 addresses at least three main architectural issues: encapsulation, maximum transfer unit ("MTU"), and address resolution. The use of protocol engines and Access Cards in SONET/SDH ring networks are described in more detail in commonly-assigned U.S. patent application Ser. No. 09/514,032 ("the '032 application"), which also is incorporated herein by reference.

If there is only one concentrator node for the entire network and there is a malfunction in that concentrator node or in a virtual path to that concentrator node, then wide area network access for one or more nodes in that network may be interrupted.

Therefore, there remains a need in this art for a method and system for providing protected virtual paths between local area networks (LANs) and wide area networks (WANs). There remains a particular need for a method and system for detecting malfunctions in a primary virtual path and for switching to the protection virtual path when a malfunction is detected. There also remains a more particular need for a method and a system that can provide protected virtual paths in a manner that minimally impacts the user computer equipment on a LAN connected to the network node on the system.

SUMMARY OF THE INVENTION

The present invention provides protected virtual paths to a customer network or LAN by providing access to a carrier network via a plurality of virtual channels. The present invention provides a mechanism for detecting failures associated with the virtual channels and a mechanism for switching from a failed virtual channel to a protection virtual channel upon detection of a failure.

The present invention provides many advantages over the presently known communication systems for providing access to a carrier network. Not all of these advantages are simultaneously required to practice the invention as claimed, and the following list is merely illustrative of the types of benefits that may be provided, alone or in combination, by the present invention. These advantages include: (1) the overall architecture of the network, with the concentrator interfaces connected to the carrier network at two different redundant locations, and the interaction between the carrier network devices (routers and bridges) and the system according to the present invention; (2) the concentrator device failure detection capability in the access device; (3) the Backbone Router failure detection capability and consequent triggering of VC switching; (4) IP layer faults detection and reporting to the access device; and (5) ATM layer fault detection and reporting to the access device.

In accordance with the present invention, a method and system for providing a customer network with high speed access to a carrier network is provided. The system comprises an access device for providing a communication path for the customer network, a first concentrator device that is operable to establish a communication path with the carrier network, and a second concentrator device that is operable to establish a communication path with the carrier network. The access device is operable to receive data traffic from the customer network and to forward the data traffic within the system. The access device is also operable to receive data traffic from the system and to drop some of the data traffic to the customer network. The first concentrator device is operable to drop data received from the system to the carrier network and also operable to add data received from the carrier network to the system data traffic. The second concentrator device is also operable to drop data received from the system to the carrier network and also operable to add data received from the carrier network to the system data traffic. The access device and the first concentrator device cooperate to form a first virtual channel for allowing data traffic to flow from the customer network to the carrier network and from the carrier network to the customer network and wherein the first virtual channel is the primary communication channel for the customer network. The access device and the second concentrator device cooperate to form a second virtual channel for allowing data traffic to flow from the customer network to the carrier network and from the carrier network to the customer network and wherein the second virtual channel is a backup communication channel for the customer network. The system is operable to switch the primary communication channel from the first virtual channel to the second virtual channel upon detection of a failure in the first virtual channel.

BRIEF DESCRIPTION OF THE DRAWINGS

The present invention will become more apparent from the following description when read in conjunction with the accompanying drawings wherein.

DETAILED DESCRIPTION OF THE PREFERRED EMBODIMENT

The present invention provides a system for protecting against a loss of services by providing protection virtual channels.

A. Multi-homed Reference Network

Figure 1:
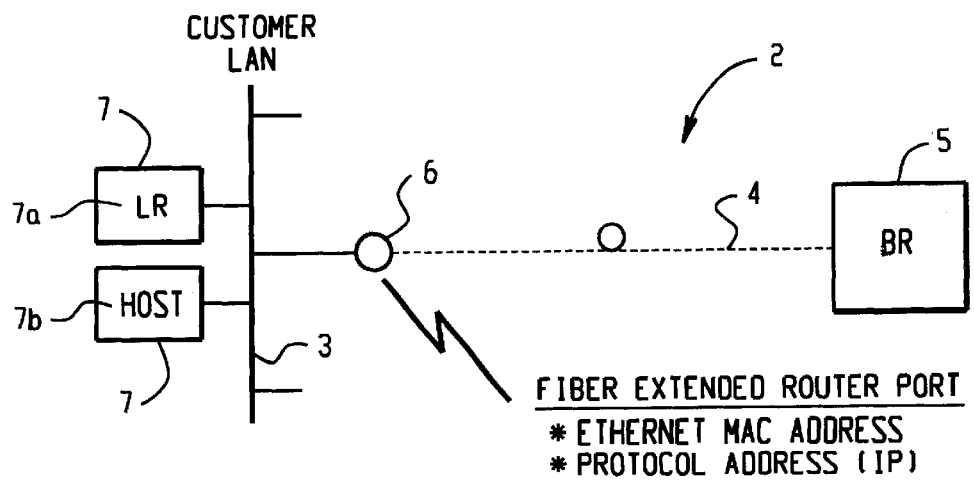
FIG. 1 is a schematic drawing of a communication system having a fiber extended router port.
Figure 2:
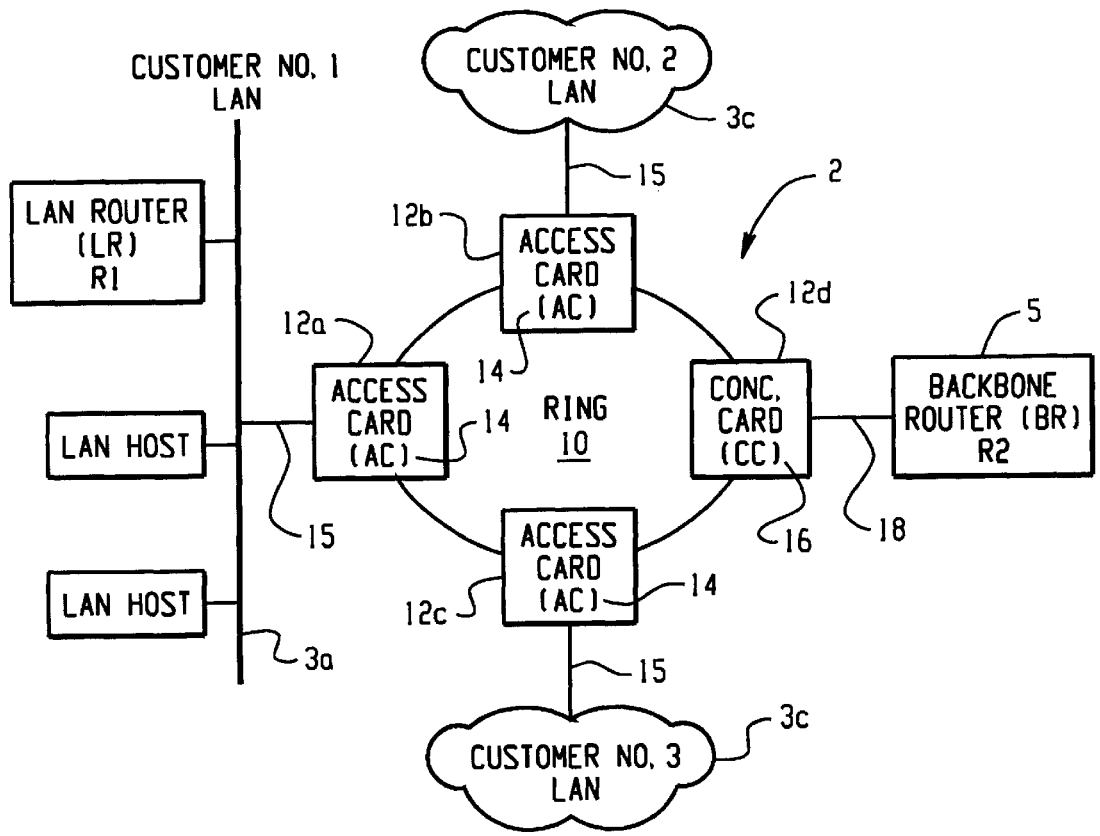
FIG. 2 is a schematic drawing of a communication system that provides multiple LANs with access to a WAN via a ring network.
Figure 3:
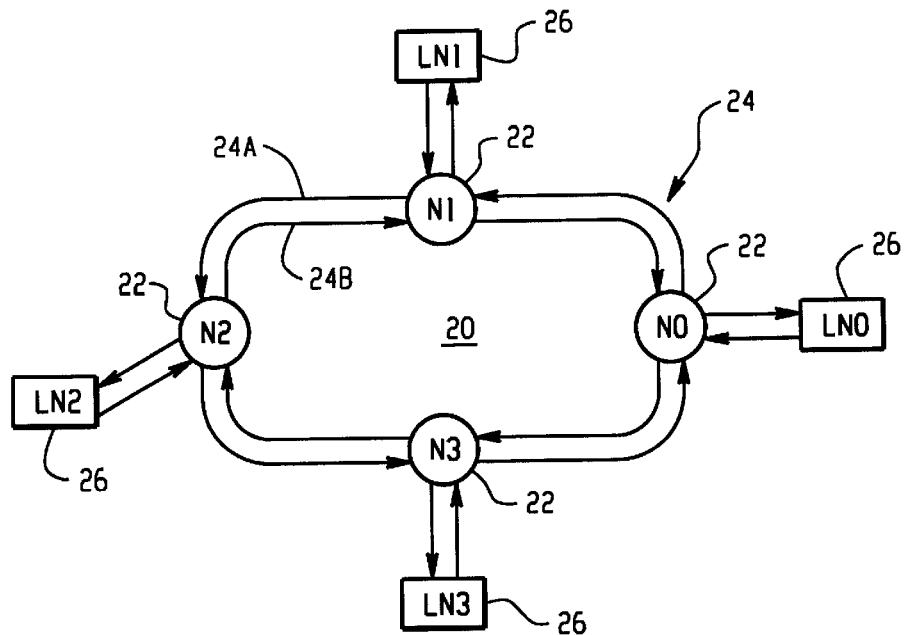
FIG. 3 is a schematic drawing of an optical ring network used in a preferred embodiment of the invention.
Figure 4:
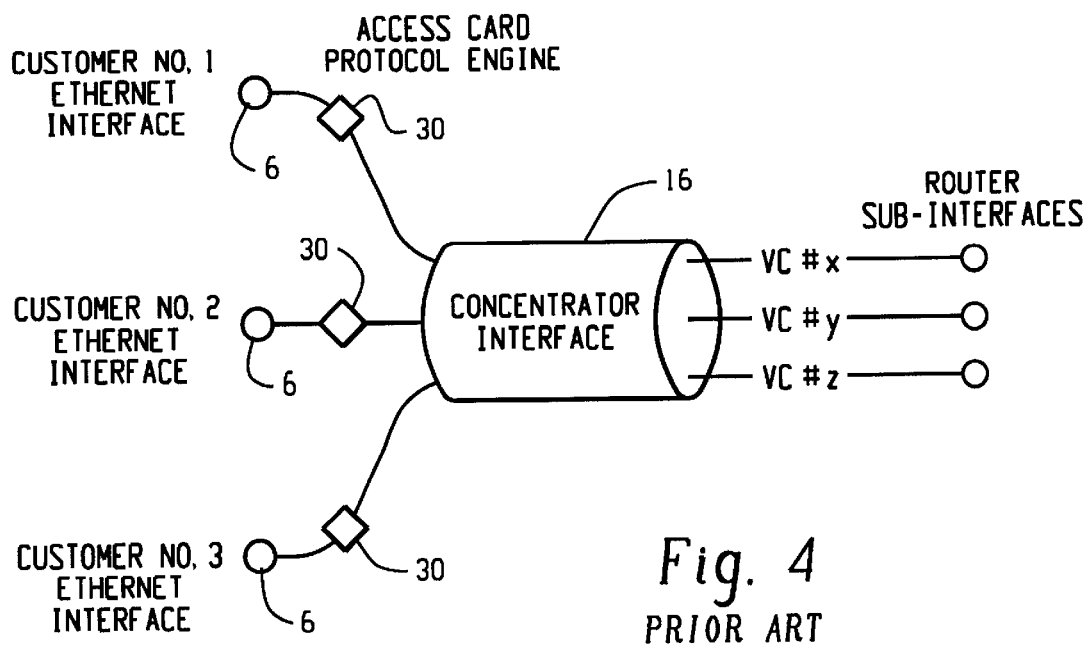
FIG. 4 is a schematic view of a communication system that provides multiple LANs with access to a WAN.
Figure 5:
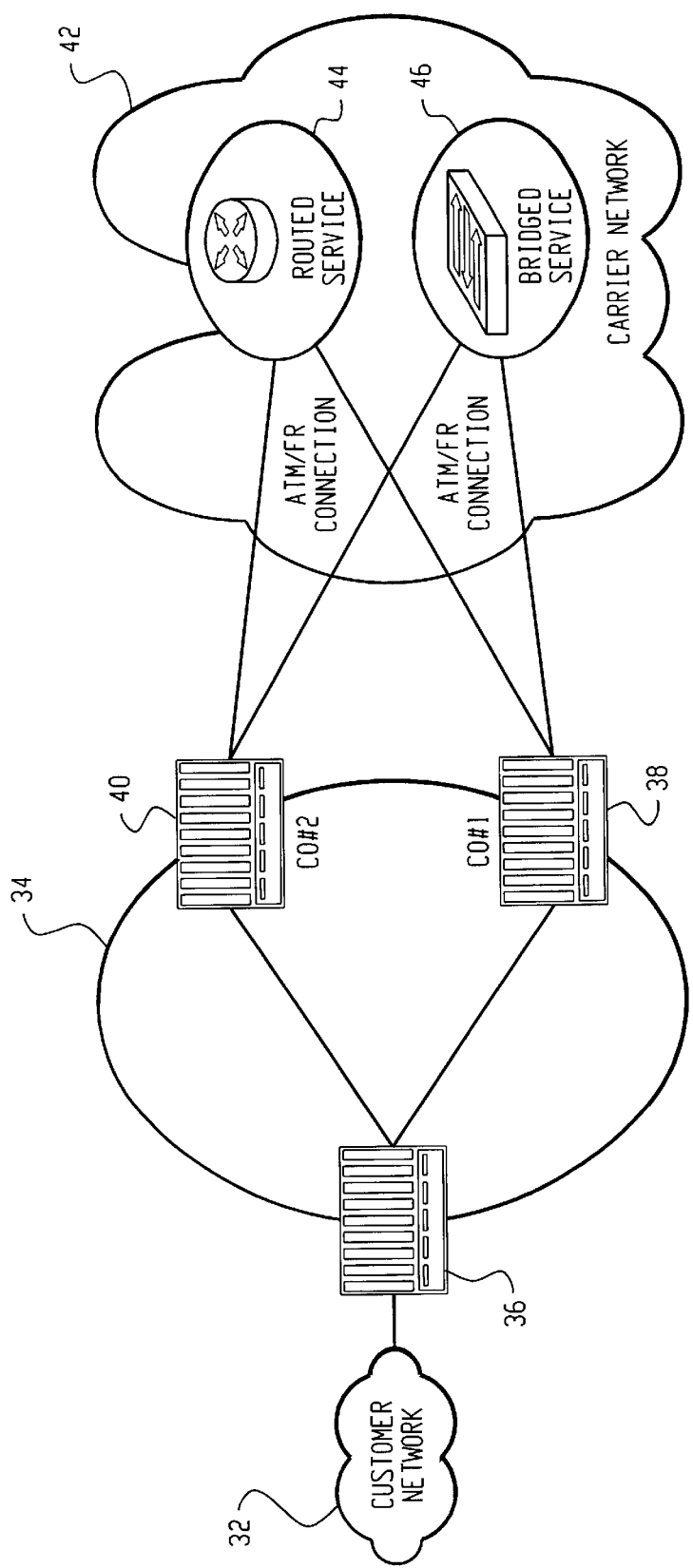
FIG. 5 is a schematic diagram of a network that provides redundant concentrator interfaces.

In a preferred embodiment, a user or customer LAN 32 is connected via a ring 34 and a network node device 36 to two Central Offices (CO) 38, 40, as shown in FIG. 5. To interface with the user LAN 32, the network node device 36 preferably includes an access card 14 which preferably provides an Ethernet port as the interface for the user LAN 32. The central offices 38, 40 connect the ring 34 to the global carrier network 42. The central offices 38, 40 preferably include a concentrator card 16 that interfaces with and provides the connection to the carrier network 42. The carrier network 42 provides routed services 44 and bridged services 46 for allowing devices coupled to the ring 34 to connect and transport data packets to and from WANs or the internet. The protection switching mechanism offered by the present invention ensures that if there is a failure of either the CO#1 38 equipment or the link connecting the CC in CO#1 38 to the carrier network 42, then all the traffic is delivered from and to the CO#2 40. The present invention also provides a mechanism whereby the routed services 44 and the bridged services 46 provided by the carrier 42 are made available even in the case of failure of one of the two COs 38, 40.

The ring 34 of the preferred embodiment includes two or more network node devices. Two of the network node devices are COs preferrably having CCs 16 for connecting to a carrier network 42. One of the network node devices is coupled to a user LAN and preferably includes an AC 14 for providing the coupling. The network node device that is coupled to the user LAN preferably is not one of the COs but optionally could be one of the COs. One skilled in the art could configure the ring 34 in a number of configurations without departing from the scope of the present invention.

Figure 6:
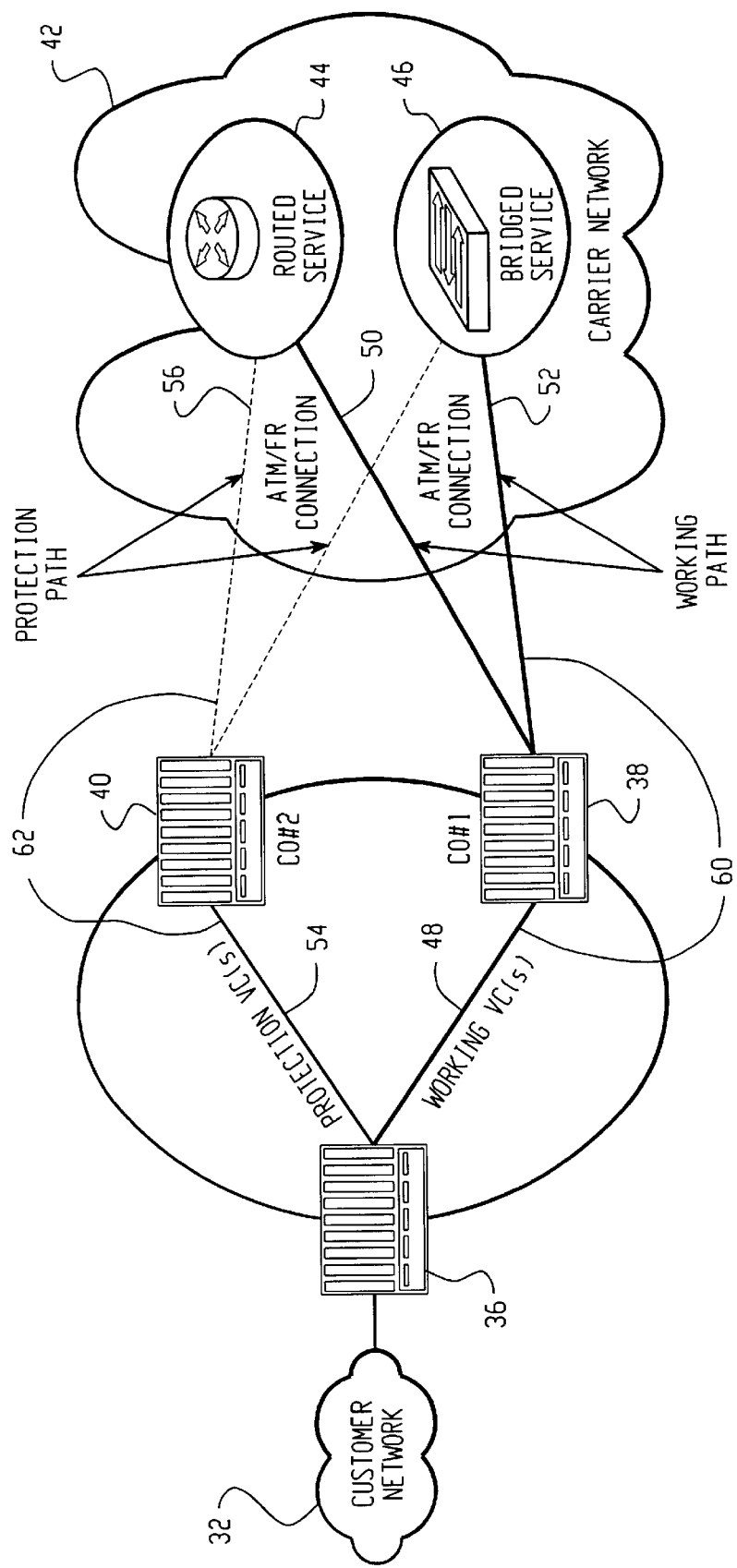
FIG. 6 is a schematic drawing of a network illustrating the transmission of traffic via a working virtual channel.

As shown in FIG. 6, to make the routed services 44 and the bridged services 46 available on a protected basis, provided are a working virtual channel ("VC") 48, a routed services working ATM virtual channel 50, a bridged services working ATM virtual channel 52, at least one protection VC 54, at least one routed services protection ATM virtual channel 56, and at least one bridged services protection ATM virtual channel 58. Therefore, the user LAN 32 is provided with routed service 44 and bridged service 46 in the carrier network 42 via a working VC 48 to CO#1 38 and working ATM virtual channels 50 and 52 to routed service 44 and bridged service 46, respectively. In addition, the user LAN 32 is provided with routed service 44 and bridged service 46 in the carrier network 42 via a protection VC 54 to CO#2 40 and protection ATM virtual channels 56 and 58 to routed service 44 and bridged service 46, respectively. The working VC 48 and working ATM virtual channels 50 and 52 shall be referred hereinafter as working PVC 60, and the protection VC 54 and working paths 56 and 58 shall be referred hereinafter as protection PVC 62. The protection PVC 62 typically is not used to carry any traffic in the upstream direction and traffic in the downstream direction may be optionally disabled.

The upstream direction is defined as the direction of transmission running from the user to the carrier network. The downstream direction is defined as the direction of transmission running from the carrier network to the user. The provision of a working PVC and a single protection PVC to a user LAN is referred to hereinafter as dual-homing to two COs. The provision of a working PVC and multiple protection PVCs is referred to hereinafter as multi-homing to multiple COs. For simplicity of presentation, the present invention will be described with reference to dual-homing but it is understood that the same principals could be applied to multi-homing.

In accordance with the present invention each CO could be connected to separate router devices in the carrier network or alternatively to the same router device without departing from the spirit of the present invention. Also, each CO could be connected to separate bridged service devices or alternatively to the same bridged service device without departing from the spirit of the present invention.

B. Failure Detection

Figure 7:
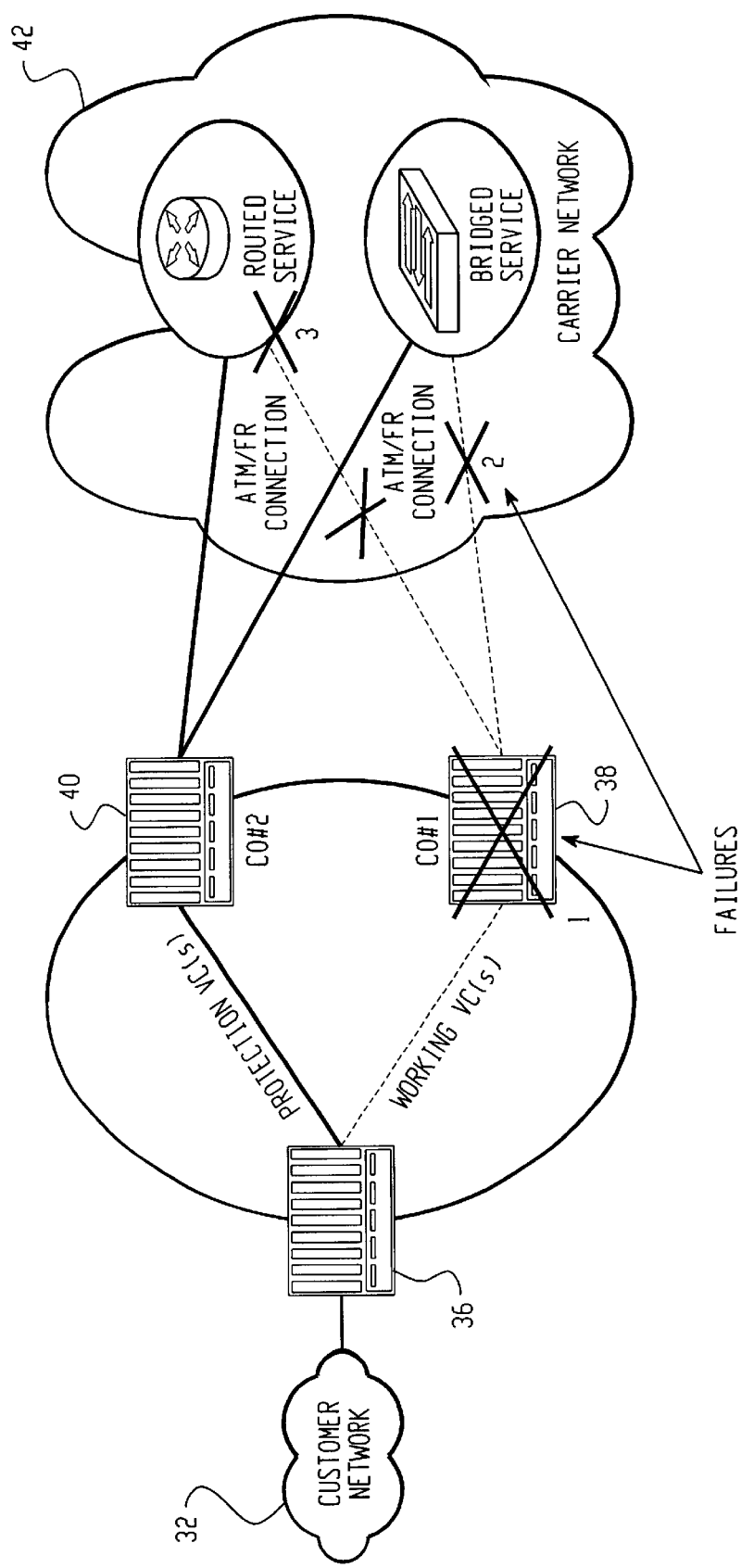
FIG. 7 is a schematic drawing of a network illustrating the transmission of traffic via the protection virtual channel after a failure has been detected.

The multi-homing system is implemented such that switching from a working PVC 60 to a protection PVC 62 has little or no impact on the user LAN 32. FIG. 7 illustrates a situation where a protection switching has occurred due to a failure of the CO 38, a failure in the working paths 50, 52, or a failure of the routed service 44. At the AC 14, the traffic is switched to the protection PVC 62. Upstream and downstream traffic now flows through the protection paths.

1. Backbone Router Failure Detection

The CC 16 at CO #1 38 implements a number of failure detection mechanisms to detect IP layer failures with the routed service, which preferably is provided by a BR 5. If a failure occurs with the BR 5, the CC at CO#1 38 can detect the failure using an OSPF failure detection mechanism, a RIP failure detection mechanism, and an active detection mechanism. These detection mechanisms are configurable on a PVC basis in the CC. These failure detection mechanism will be described more fully below.

Upon detection of a BR 5 failure at the other end of the working ATM or FR path 50, the CC at CO#1 38 notifies the AC 14 at node 36 that the working PVC 60 is in a faulty condition so that the AC 14 at node 36 can switch traffic to the protection PVC 62. The CC at CO#1 38 preferably notifies the AC 14 at node 36 of the failure via an asynchronous virtual path control protocol ("VPCP") message to the AC 14 at node 36. The VPCP message is a message used on optical ring networks to transfer status information. The VPCP message provides a digital link channel identifier ("DLCI") and status information regarding the digital channel identified by the DLCI number. The cause of the fault, in this case, is the failure of the BR 5, and it is not reported by the CC 16 to the AC 14.

a. OSPF Failure Detection

A first failure detection mechanism for detecting BR 5 failures is an Open Shortest Path Protocol ("OSPF") snooping function that is implemented by the CC 16. When using this function, the CC 16 inspects incoming OSPF messages on the working FR/ATM path 50. This mechanism can be activated/deactivated on a per PVC basis. Upon failure to receive a hello packet from the BR 5 within a configurable timing window called a dead timer, the CC 16 declares a failure of the BR 5.

If the dead timer expires, the CC 16 preferably determines that the BR 5 is down. The BR 5 sends hello packets at designated intervals which are configurable in the BR 5. Therefore, the dead timer preferably should be configurable. Preferably, the default value of the dead timer is four times the value of the Hello interval. That results in a dead timer default of 40 seconds for broadcast networks and two minutes for non-broadcast networks.

The BR 5 can be declared functional and the working path 52 active if three consecutive hellos are received without the timer expiring. The CC 16 can then notify the AC 14 that the PVC 60 is operational via a VPCP message.

b. RIP Failure Detection

A second failure detection mechanism for detecting BR 5 failures is the RIP failure detection mechanism implemented by the CC 16. When using this failure detection mechanism, the CC 16 can declare the BR 5 down and the PVC not active after a configurable time (preferably more than 30 seconds) during which the CC 16 did not receive any RIP messages from the BR 5. To reactivate the PVC, the CC 16 can declare the BR 5 up and the PVC active if a number of consecutive RIP messages are received, preferably three, without the timer expiring. The CC 16 notifies the AC 14 of the status of the PVC via a VPCP message.

c. Active Detection of Router Failure

Figure 8:
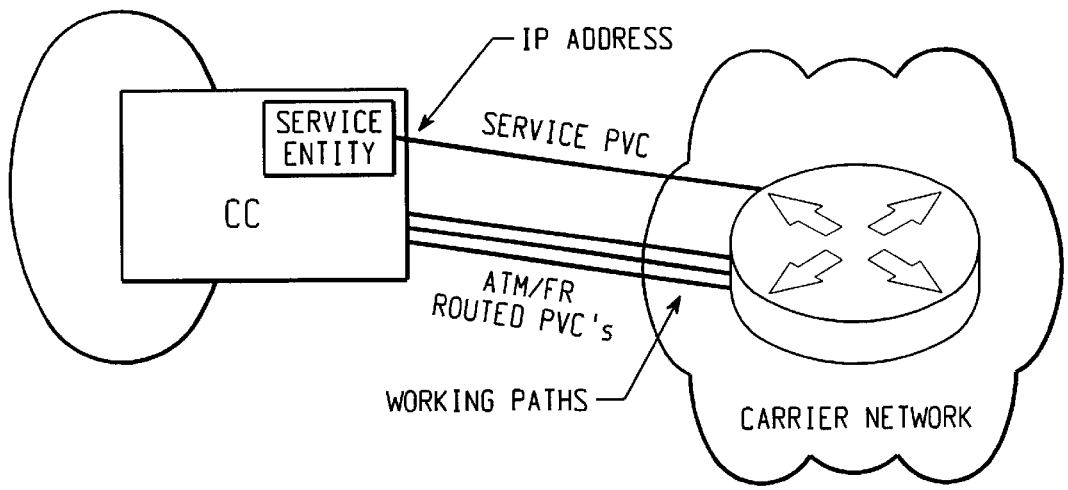
FIG. 8 is a schematic drawing of a network illustrating active detection of router failures.

A third failure detection mechanism available for detecting BR 5 failures is an active detection mechanism. When using this failure detection mechanism, the CC 16 makes use of its IP address. Each CC 16 has a "service entity" with an IP layer address associated with a "service" PVC; several agents can reside at that address such as the DHCP Relay agent. No traffic flows on the service PVC other than traffic that the Service Entity originates. FIG. 8 illustrates the active detection mechanism. The service entity residing in the CC 16 uses the "ping" application to verify that the BR 5 is up, using ICMP Echo messages as described in RFC 792 (ICMP), which is incorporated herein by reference. If a number of consecutive pings, preferably more than 3, are unsuccessful (no echo reply), the CC can declare that the BR 5 is unreachable and issue VPCP messages to that effect to the AC 14 for all the working routed VCs terminated to the same Router 5 as the "service PVC." The CC 16 can reactivate the working PVC if more than preferably 3 consecutive pings are successful and will notify the AC 14 via a VPCP message.

2. CC1 Failure

Figure 9:
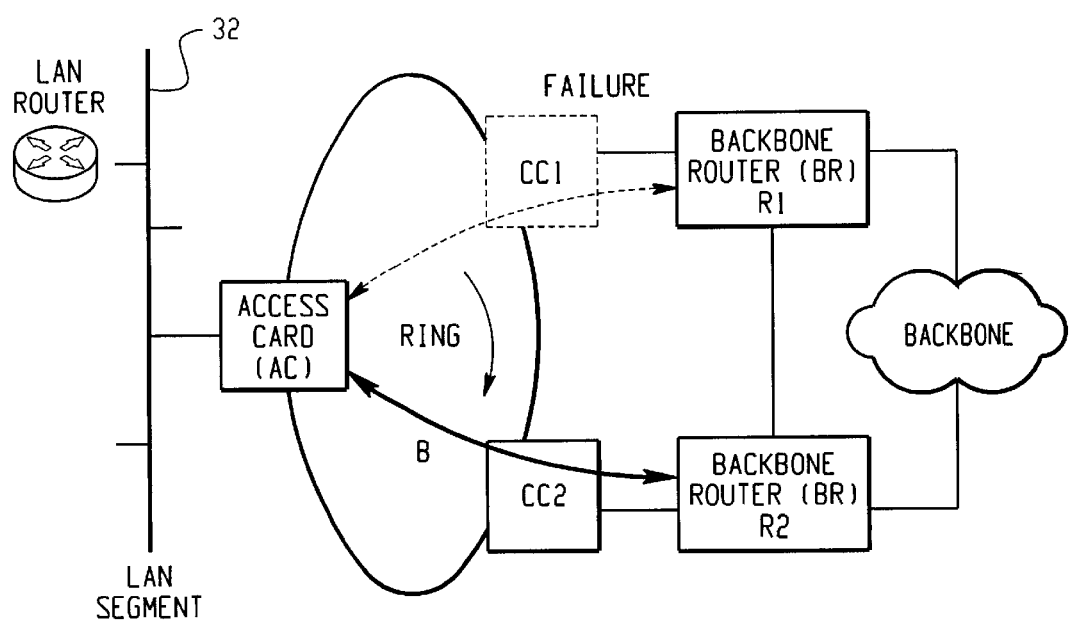
FIG. 9 is a diagram illustrating concentrator card failure detection by the protection concentrator card.

The multi-homing system is capable of switching traffic from the working PVC to the protection PVC in the case of a failure with the CC 1 in the working PVC. In this case, the node that contains CC 2 detects the failure of CC 1 and notifies the AC which in turn switches traffic to the protection PVC as illustrated in FIG. 9. CC 2 may be informed of the CC 1 failure by other nodes via a new protocol or via VPCP extensions. When informed, CC 2 then enables the "Add/Drop" cross-connect with backbone router R2.

Backbone router R1, LAN router LR and the LAN hosts detect dynamically that the link to the working PVC 60 is broken and makes use of normal routing protocols to overcome this failure. For example, backbone router R1 may detect CC1 failure from ATM OAM (AIS/RDI cells, Continuity Check) or from LOS at SONET layer. As the default is declared, the working PVC 60 is declared down and the backbone router R1 link to the customer network is no longer valid. Other backbone routers will be informed of the downed link via routing protocols.

a. CC Failure Detection Mechanism

Figure 10:
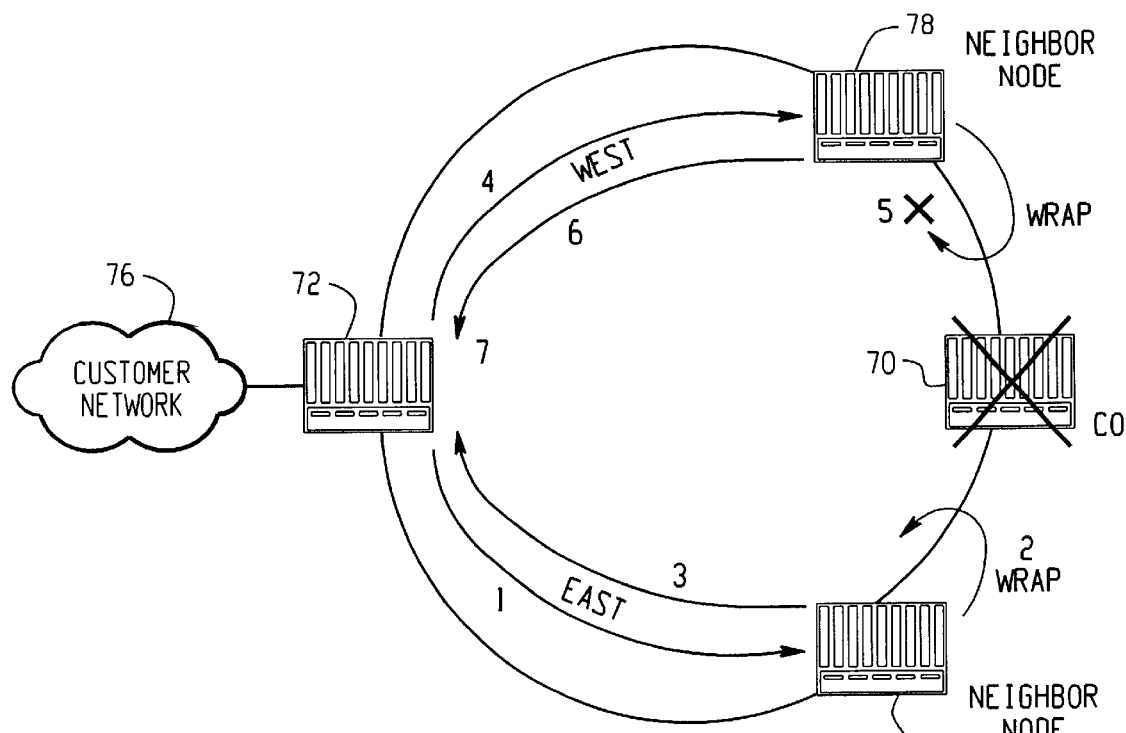
FIG. 10 is a schematic drawing of a network illustrating concentrator card failure detection by the access card.
Figure 11:
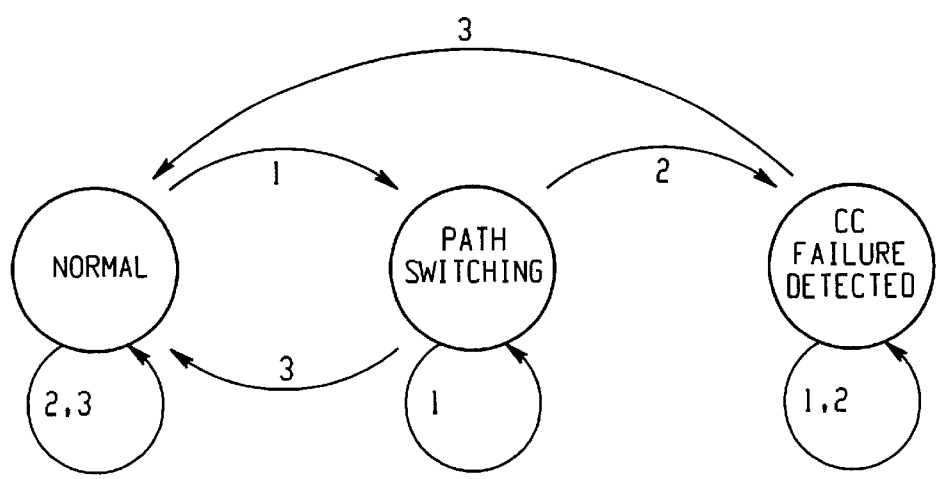
FIG. 11 is a state diagram illustrating the access card path switching algorithm.

A failure detection mechanism utilized in the multi-homing system for detecting CC failures is described next. When the CC in CO#1 70 fails, the neighbor nodes will detect the failure at SONET level and will trigger the Wrap mechanism illustrated in FIG. 10. The AC at node 72 sends traffic to the working path, in this case the "east" path (1). Then, the node next to the node 72 with the failed CC (2) wraps the packs, and sets the FWN bit. The FWN bit is a bit in the SONNET header that indicates whether the frame has been wrapped within the ring. The wrapped packets arrive to the AC at node 72 (3), where they are dropped and continued. Dropped means being taken from the ring traffic and handed off to a local interface. Continued means forwarded to other network nodes. The AC at node 72 performs Path switching and new packets coming from the Customer Network 76 are sent to the "west" path (4). The other neighbor node 78 wraps packets with FWN=0 and drops packets with FWN=1 (5). Packets addressed to the failed CC then come back to the AC at node 72 from the west path (6). The AC detects the resulting "oscillation" and performs VC switching on the "oscillating" VC, as illustrated in the State machine in FIG. 11. The operation of the AC to detect the CC failure is illustrated in FIG. 11 and the following Tables 1 and 2.

TABLE 1

Events associated with CC failure detection

| Event | Description |
|---|---|
| 1 | FWN signal on working VC, received from the current forwarding Path |
| 2 | FWN signal on working VC, received from the new current forwarding Path (after Path switching) |
| 3 | Continuity asserted and WTR |

TABLE 2

States associated with CC failure detection

| State | Description |
|---|---|
| Normal | Normal operating state for the working PVC |
| Path Switching | Path switching state |
| CC failure detected | CC failure has been detected in the AC. |

3. Physical and Layer 2 Fault Detection

The multi-homing system has a mechanism for detecting physical and Layer 2 faults. The CC 16 detects Asynchronous transfer mode ("ATM") layer faults via OAM F4/F5 cells. F4/F5 AIS/RDI faults are preferably detected. The CC 16 responds to received AIS cells by sending RDI cells.

The CC 16 detects frame relay ("FR") layer PVC faults via LMI. When the working PVC becomes unavailable due to a failure at the ATM, FR or SONET level of the CC 16 interface, the CC 16 alerts the AC 14 by sending a VPCP message. The VPCP messages issued by the CC 16 report the status of the VCs.

C. VC Switching Mechanism

Figure 12:
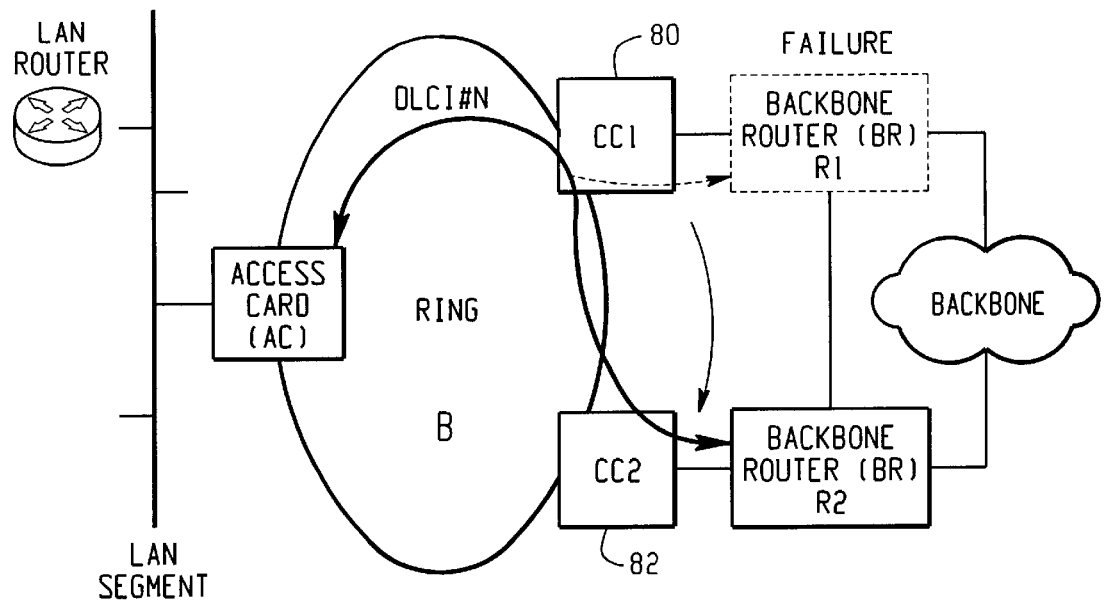
FIG. 12 is a schematic diagram illustrating virtual channel switching after the protection concentrator card detects a failure in the working virtual channel.

The present invention provides a number of mechanisms for switching traffic from a working PVC 60 to a protection PVC 62. In a first case, when CC1 80 detects a backbone router R1 failure, CC1 80 configures the PVC 60 with a "continue" cross-connect and passes traffic through to CC2 82 as illustrated in FIG. 12. CC2 is also informed of the failure and it functions as an "add/drop" cross-connect to backbone router R2.

CC2 82 can detect the failure of backbone router R1 in a number of ways. CC2 82 can be notified of the failure via VPCP messages when it observes that CC1 80 is no longer a transmitter for the PVC coming from backbone router R1. CC2 82 can detect the failure when that PVC "expires" as there are no more nodes which put that PVC in the Status Report message. Also, CC2 82 can be notified of the failure via a new asynchronous message carried by VPCP and sent by the node that contains CC1 80. After notification of the failure of backbone router R1, the CC2 82 configures the PVC with an "add/drop" cross-connect with backbone router R2.

Switching back to the original PVC can also be enabled. When the backbone router R1 becomes operational again, the original path may optionally be automatically restored (a.k.a. "revertive switching") if CC1 informs CC2 that the backbone router R1 is available. Also, in the case of failure with CC2 and/or BR2 failure, the original path may be restored if CC1 informs CC2 that the backbone router R1 is available.

Figure 13:
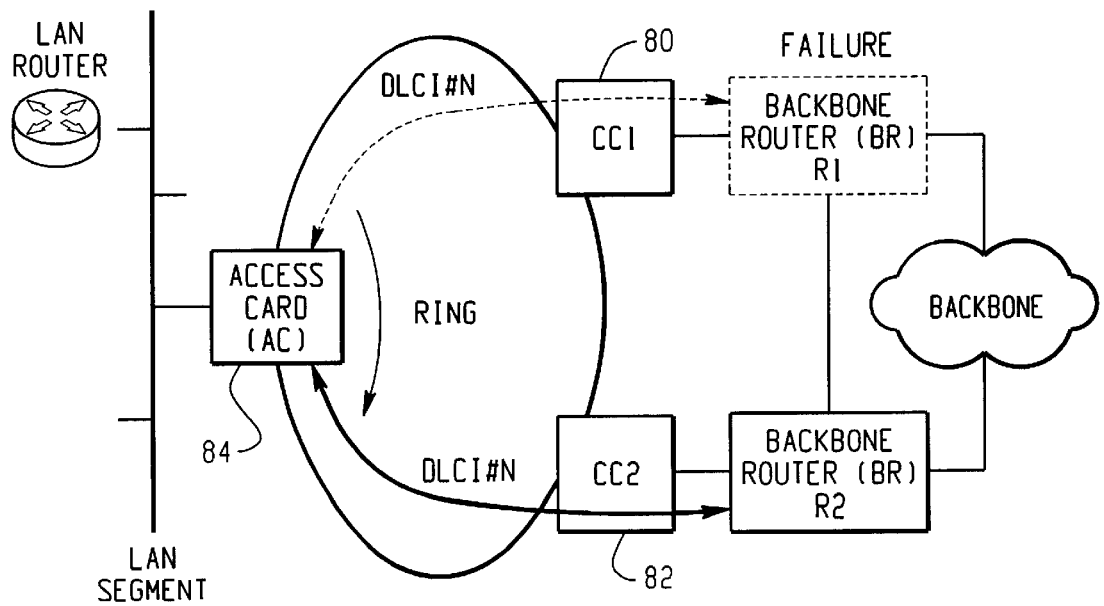
FIG. 13 is a schematic drawing illustrating virtual channel switching after the working concentrator card notifies the access card of a failure.

In a second case, CC1 80 notifies the AC 84 and CC2 82, for example, by means of VPCP or via a wrap mechanism, of the failure. As illustrated in FIG. 13, the AC 84 switches traffic to a protection PVC having the same digital link connection identifier "DLCI" number, in the protection path. CC2 82 enables "add/drop" cross-connect capability of the protection PVC. CC1 80 also configures that PVC with a "continue" cross-connect from CC1 80 to CC2 82.

Revertive switching can be enabled by CC1 80 informing CC2 82 and AC 84 when the backbone router R1 is available in case of CC2/BR2 failure.

Figure 14:
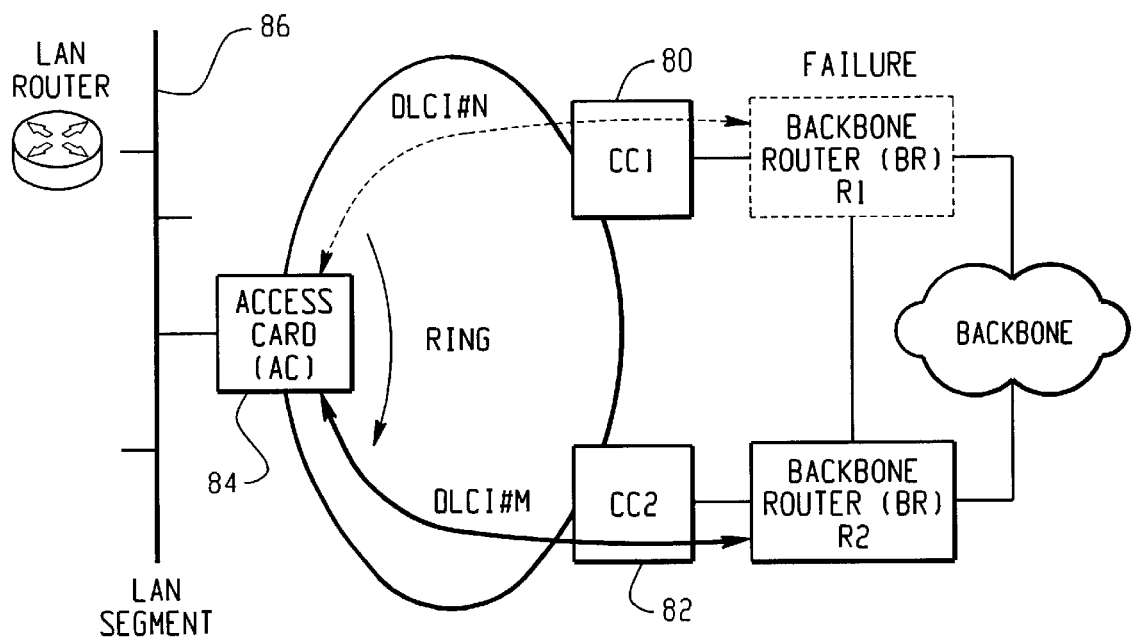
FIG. 14 is a schematic drawing illustrating virtual channel switching after the working concentrator card notifies the access card of a failure.

Third, CC1 80 notifies the AC 84 and CC2 82, for example, by means of VPCP of the failure. As illustrated in FIG. 14, the AC 84 switches traffic to a protection PVC having a different DLCI number. CC2 82 enables "add/drop" cross-connect capability of the protection PVC.

Revertive switching can be enabled by CC1 80 informing AC 84 when the backbone router R1 is available in case of CC2/BR2 failure.

Alternatively, BR failure detection can reside in the AC 84, and the CC simply propagates indications of low level failures of the ATM (POS) to devices on the ring. In this case it is the AC 84 that notifies the CC2 82 that the working PVC is no longer valid.

1. Switching Mechanism Description

Upon failure of the working path, the AC 84 is notified by means of VPCP and Wrap mechanism and switches traffic to a protection PVC, with a different DLCI number. The CC2 82 is configured to drop traffic from the protection VC.

The AC 84 treatment of packets flowing through the working PVC before switching is normal. If the user LAN 86 is connected to a routed VC, devices on the user LAN 86 preferably learn their IP address from the IRDP mechanism. Before VC switching, downstream traffic coming from protection VC is preferably forwarded but optionally could be discarded. The VC switching preferably is configured on a VC basis as revertive but optionally could be configured as non-revertive.

Figure 15:
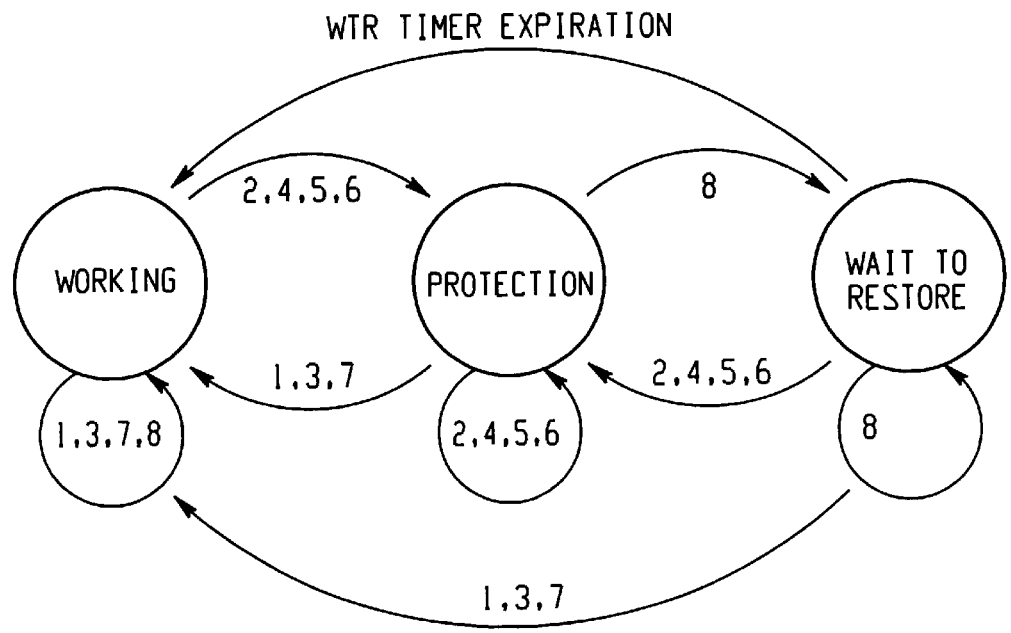
FIG. 15 is a state diagram of a revertive algorithm in the access card.
Figure 16:
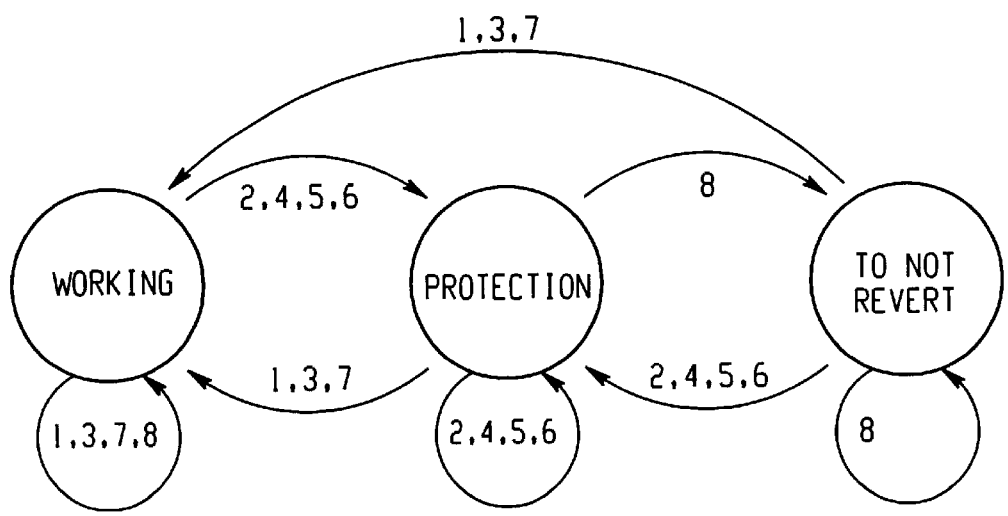
FIG. 16 is a state diagram of a non-revertive algorithm in the access card.

The state machine shown in FIG. 15 illustrates a preferred revertive switching process. The state machine shown in FIG. 16 illustrates a preferred non-revertive switching process. The events that trigger state transitions are listed below in Table 3 in order of descending priority, from 1 to 7. If more than one event occurs at a given time, the state transition shall be triggered by the event with highest priority, in accordance with Table 3. The various states are described below in Table 4.

TABLE 3

Events description for VC switching

| Event | Description |
| --- | --- |
| 1 | Lockout of Protection |
| 2 | CC failure condition |
| 3 | Protection VC failure |
| 4 | Forced switch for working VC |
| 5 | Working VC failure |
| 6 | Manual switch for working VC |
| 7 | Manual switch for protection VC |
| 8 | No request of switch[1] |

[1]This event means "there are no events", that is none of 1–6 event.

TABLE 4

States description for VC switching

| State | Description |
| --- | --- |
| Working | Upstream traffic is transmitted to working VC, and downstream traffic is forwarded according to the parameter Enable downstream traffic from protection VC |
| Protection | Upstream traffic is transmitted to protection VC, and downstream traffic is forwarded according to the parameter Enable downstream traffic from protection VC |
| Wait to restore | Upstream and downstream traffic flows through protection VC. WTR timer is configurable |
| Do not Revert | Upstream traffic is transmitted to protection VC, and downstream traffic is forwarded according to the parameter Enable downstream traffic from protection VC |

The AC 84 can issue the following commands: Lockout of Protection, Forced switch for working VC, Manual switch for protection VC, and manual switch for working VC. The Lockout of Protection command denies all working traffic access to the protection entity. The Forced switch for working VC command switches traffic to the protection VC unless the protection VC is in a faulty condition. The Manual switch for protection VC command switches traffic from protection VC to working VC. Finally, the Manual switch for working VC command switches traffic from working VC to protection VC.

After VC switching, every entity associated to the working VC (such as MAC address, the ARP process and cache, the RIP and IRDP learning processes and DHCP Relay agent) is associated to the protection routed VC. Downstream routed traffic is restored as soon as the Router at CO#2 discovers the topology change and that the LAN can now be reached via protection VC. Bridged service is restored as soon as the PVC is switched. After VC switching IRDP traffic coming from the router shall be snooped, and IP address auto-configuration will assign the IP address to the protection routed VC. If the IP address is different to that of the working VC, a gratuitous ARP shall be sent with the new IP address and the MAC address of the Ethernet Port.

2. Configurable Parameters

A number of parameters are configurable. The wait to restore ("WTR") timer is preferably set to 60 seconds and preferably has a range of acceptable values from 1–300 seconds.

In the preferred system, the following parameters are configurable in the AC per PVC: (1) VC switching enabled (ON/OFF*); (2) Revertive VC switching(ON/OFF*); (3) DLCI of protection VC (valid DLCI number); and (4) Enable downstream traffic from protection VC (ON*/OFF). The states followed by the asterisk are the default states in the preferred system In the preferred system, the following parameters are configurable in the CC per PVC: (1) ATM layer failure detection enabled (ON/OFF*); (2) IP layer OSPF failure detection enabled (ON/OFF*); (3) OSPF Dead timer (1–255 seconds); (4) IP layer RIP failure detection (ON/OFF*); (5) RIP timer (30–300 seconds, default 75); (6) Ping mechanism enable (ON/OFF*); and (7) Ping interval (1–60 seconds, default 10).

D. Impact on Customer Network Configurations

1. Bridged VC

The protection system of the present invention can be utilized in a network that uses the common carrier to provide a bridged connection for data traffic from a user network 96 to a remote network 98. Such a network could be have an asymmetric topology or a symmetric topology.

a. Asymmetric Configuration

Figure 17:
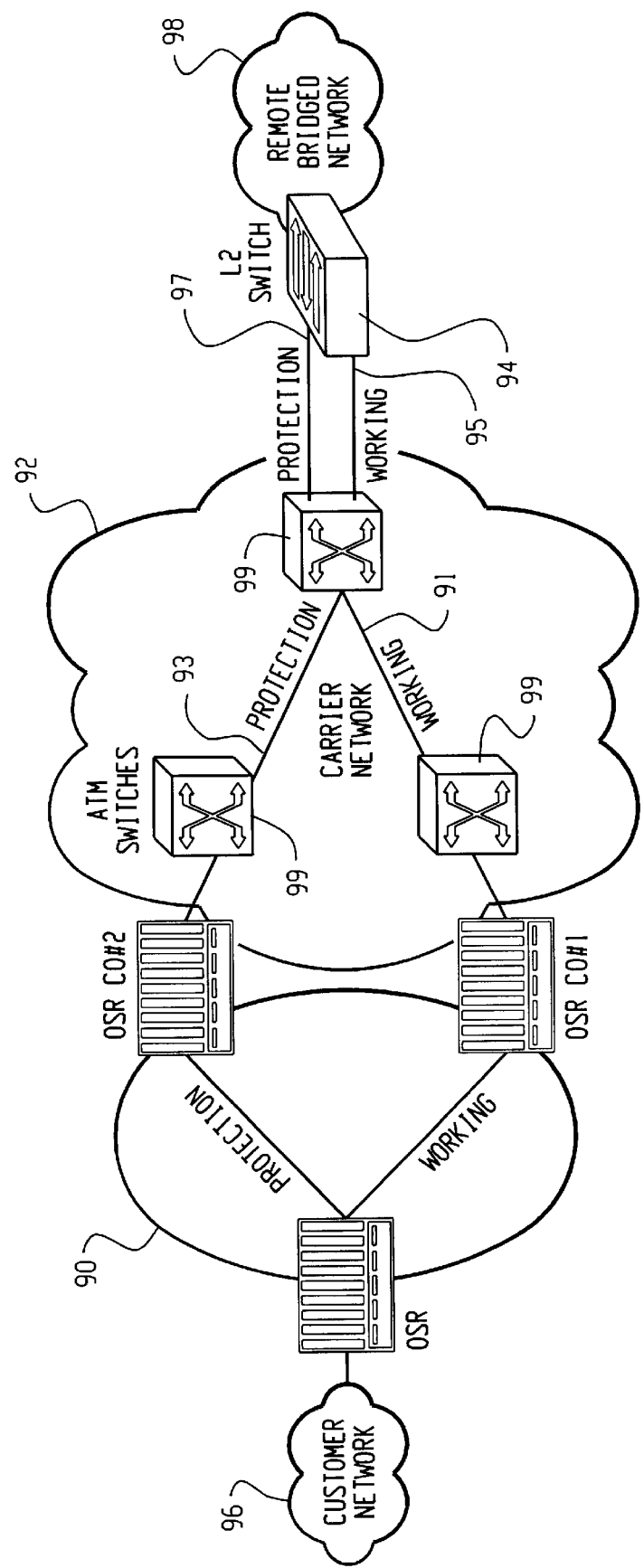
FIG. 17 is a schematic diagram illustrating a system with an asymmetric configuration.

An exemplary asymmetric configuration is shown in FIG. 17 in which there is a ring network 90 on one end of the carrier network 92 and a L2 switch 94 at the other end. The carrier 92 bridges the traffic from the customer network 96 to a remote location 98, presenting two Ethernet bridged ATM PVCs 91, 93 to the remote network 98. Preferably, the remote network 98 interfaces the carrier 92 with a L2 switch 94, which terminates the ATM signals and extracts Ethernet frames. An exemplary L2 switch 94 is a Catalyst 5000. Alternatively, the L2 switch 94 can be a part of the carrier 92 and the carrier 92 presents a single PVC or Ethernet interface to the remote network 98.

Before any VC switching, all the traffic passes through the working PVC 91. The L2 switch 94 is working and passing traffic received through the port 95 connected to the working PVC 91, but the port 97 connected to the protection PVC does not receive traffic and no MAC addresses are learned by that port 97. If the ATM switches 99 runs the Spanning Tree Protocol, the bridged port 97 of L2 switch 94 remains in the "block state": it does not participate in frame relay and discards received frames. The bridge, however, includes the port 97 in the computation of the active topology.

After VC switching due to a detected failure, the switch 94 will receive frames coming from the protection PVC 93, and the port 97 will learn MAC addresses on the remote network 98. The switch 94 forwards frames received from the port 97 that is connected to the protection PVC 93. The primary impact to the hosts and routers on the customer networks 96, 98 due to VC switching is that the devices on the customer networks 96, 98 must learn their new IP addresses using traditional protocols after VC switching occurs.

b. Symmetric Configuration

Figure 18:
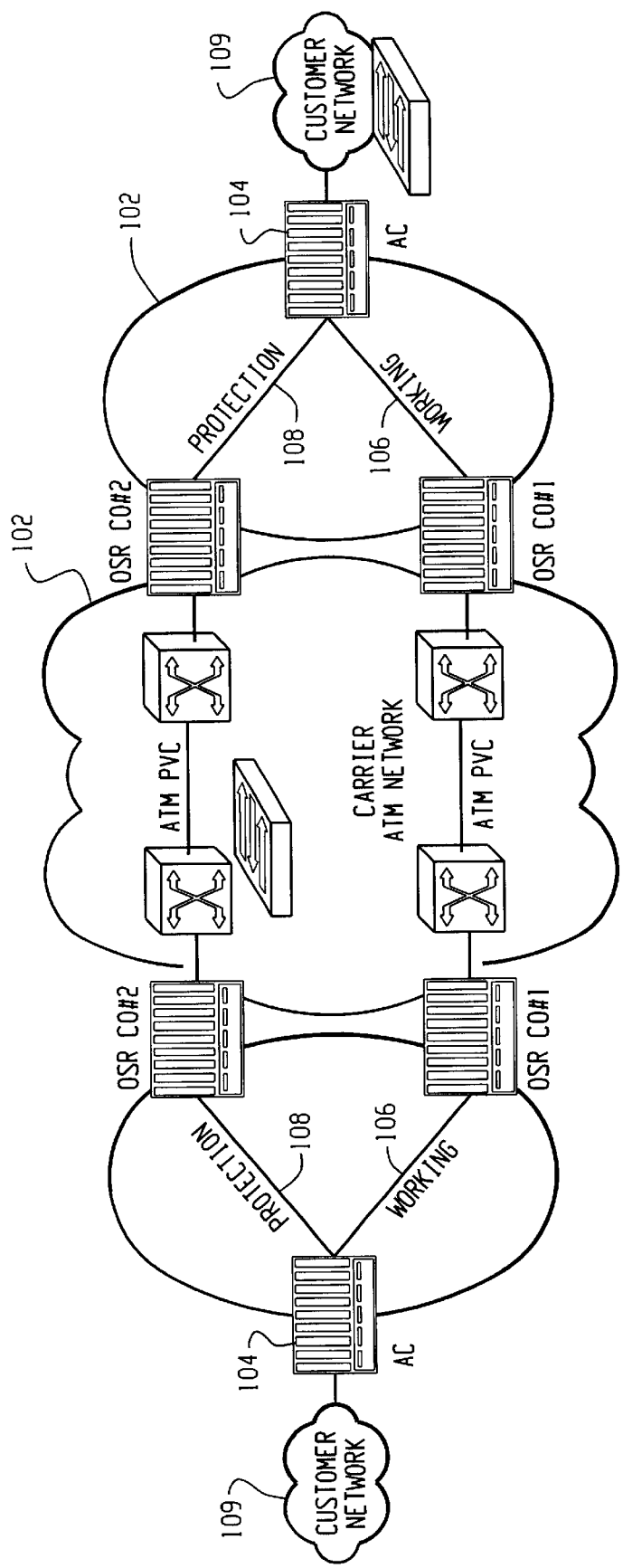
FIG. 18 is a schematic diagram illustrating a system with a symmetric configuration.

An exemplary symmetric configuration network is shown in FIG. 18 in which there is a ring network 100 on each end of the carrier network 102. Each AC 104 sends bridged traffic to to the far end AC 104 using the working VC 106. Each AC 104 forwards downstream traffic coming from both protection 108 and working 108 VCs.

When a fault occurs in the ATM network 102, the fault will be reported to both the ACs 104 via ATM OAM cells (AIS/RDI) or Frame Relay LMI and VPCP. As a result, The two ACs 104 will switch forwarding of traffic to the protection PVC 108. The primary impact to the hosts and routers on the customer networks 109 due to VC switching is that the devices on the customer networks 109 must learn their new IP addresses using traditional protocols after VC switching occurs.

2. Routed VC

Figure 19:
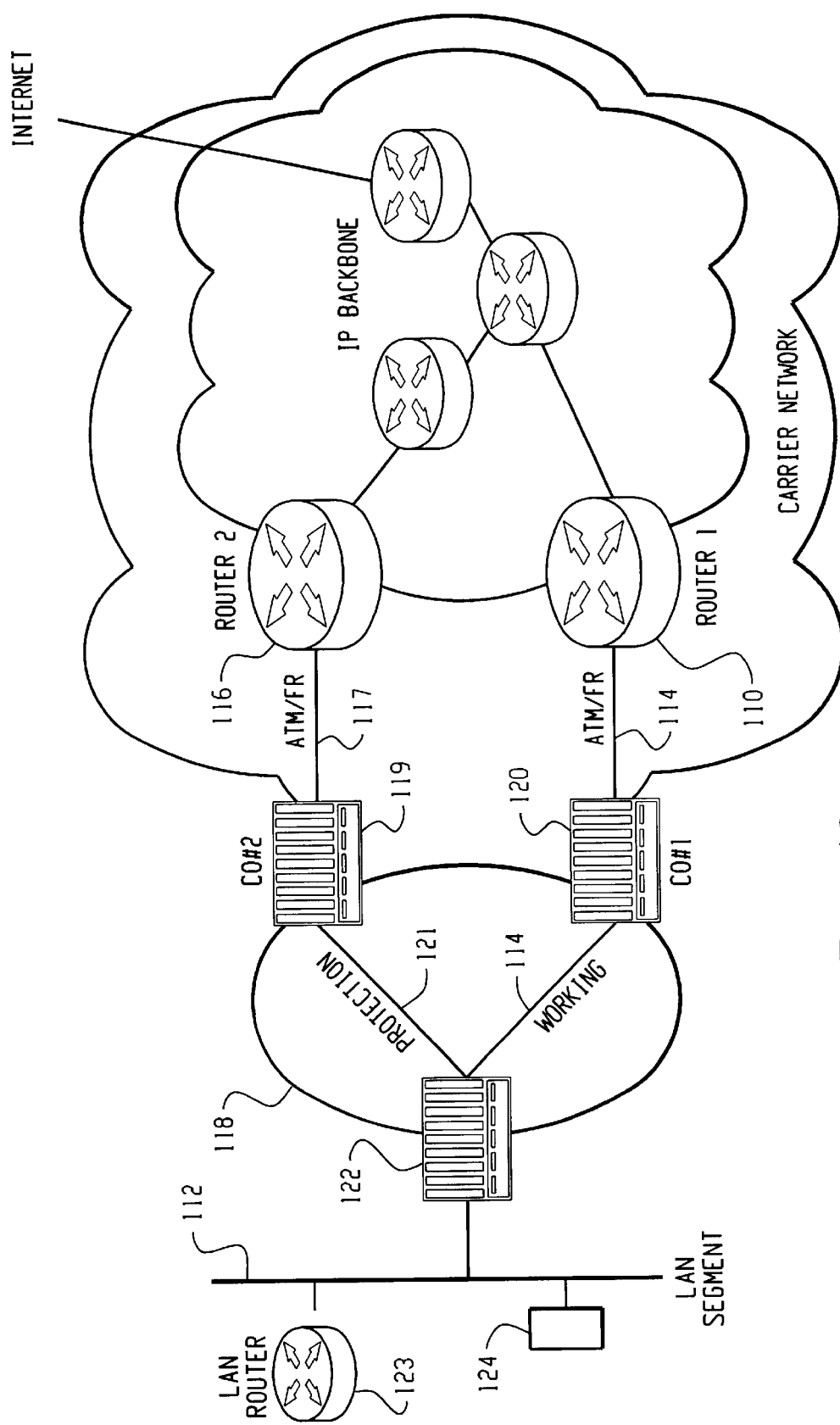
FIG. 19 is a schematic diagram illustrating the impact of the present invention on a customer LAN.
Figure 20:
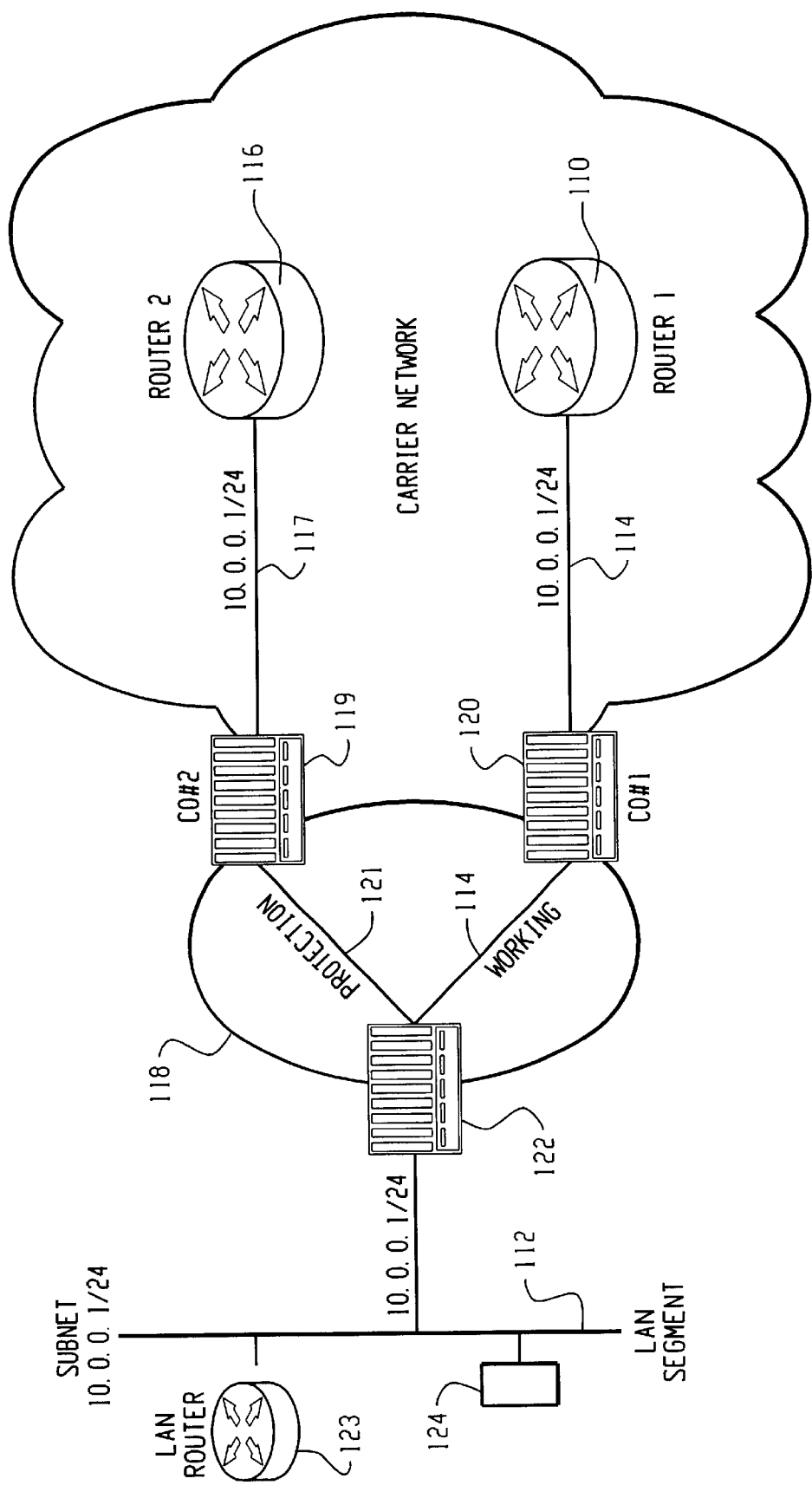
FIG. 20 is a schematic diagram of an alternate embodiment illustrating the impact of the present invention on a customer LAN.

In the case of routed VCs, the impact of VC switching on customer networks is minimal. An exemplary system is illustrated in FIG. 19. Backbone router 1 110 is connected to the LAN 112 via the working end to end PVC 114. Backbone router 2 116 is operational and connected to the backbone of the carrier network. The backbone router 2 116 interface is configured as if attached to the customer LAN 112. An ATM/FR PVC 117 is configured and terminated in the CC #2 119 and is inter-worked with the protection VC 121 inside the ring 118. To minimize the impact on the customer network, the IP address of the backbone router 2 116 interface is preferably the same as the IP address of the backbone router 1 110 interface as illustrated in FIG. 20. Traffic passes through CC #1 120. The AC 122 treatment of packets to/from the working PVC 114 is normal. If the customer port is connected to a routed VC, it may learn its IP address from IRDP. Backbone router 2 116 cannot reach the LAN router 123 and cannot establish adjacency with it.

After VC switching Backbone router 1 110, LAN router 123 and the hosts 124 detect dynamically that the working PVC 114 is broken and recover from this situation through the routing protocols. When there is a failure of CC #1 120 or of the working ATM/FR PVC, the OAM cells or the LMI will notify the Backbone router 1 110 and it will declare the ATM/FR sub-interface as down. The routing protocols will take appropriate action, and after a re-convergence period of time, the other routers will learn the new topology and send traffic via the backbone router 2 116. Similarly, the LAN router 123 will learn the new topology because of its routing protocol.

a. Flat Customer LAN

Hosts 124 attached to the LAN 112 should detect the failure of Backbone router 1 110 and react dynamically to recover from the situation. There are several options for the configuration and behavior of the hosts 124. In one embodiment, the hosts 124 on the LAN 112 have configured a default gateway. Using this method a host 124 is statically configured to know the IP address of its default router. If that router, however, becomes unavailable, the host 124 will not be able to communicate with devices off of the local LAN segment 112 even if there is another router available through an alternative PVC. In this embodiment, the hosts 124 must be manually re-configured so that the backbone can be reachable.

In a second embodiment, the hosts 124 on the LAN 112 are configured with a list of default gateways. If the primary default gateway fails, the hosts 124 detect the failure and switch automatically to the next default gateway in the list. The default gateway list preferably includes Backbone router 1 110 and Backbone router 2 116. VC switching preferably occurs before hosts 124 begin sending packets to Backbone router 2 116 so that disruption of upstream service is minimized. In this embodiment, the hosts 124, the hosts 124 automatically reconfigure themselves as soon as they learn by IRDP or RIP that Backbone router 2 116 is available.

In a third embodiment, the hosts 124 on the LAN 112 use the ICMP Router Discover Protocol ("IRDP") to listen to router hellos. This allows a host 124 to quickly adapt to changes in network topology. IRDP may help hosts 124 to update their route cache and default gateway list. To facilitate this, after VC switching has occurred, Backbone router 2 116 preferably transmits unsolicited IRDP advertisements. As a result, the hosts 124 can readily add cache and default gateway list. To facilitate this, after VC switching has occurred, Backbone to their list of default gateways. In this embodiment, the hosts 124, the hosts 124 automatically reconfigure themselves as soon as they learn by IRDP that Backbone router 2 116 is available.

In a fourth embodiment, IP hosts 124 use "silent RIP" to 'learn' the available upstream gateways and builds their own default router tables. In this embodiment, the hosts 124, the hosts 124 automatically reconfigure themselves as soon as they learn by RIP that Backbone router 2 116 is available.

To minimize the period of service disruption and operational complexity, The backbone routers may optionally be provisioned with the same IP address on the customer LAN 112, as illustrated in FIG. 20.

b. Customer Network with Firewall

Figure 21:
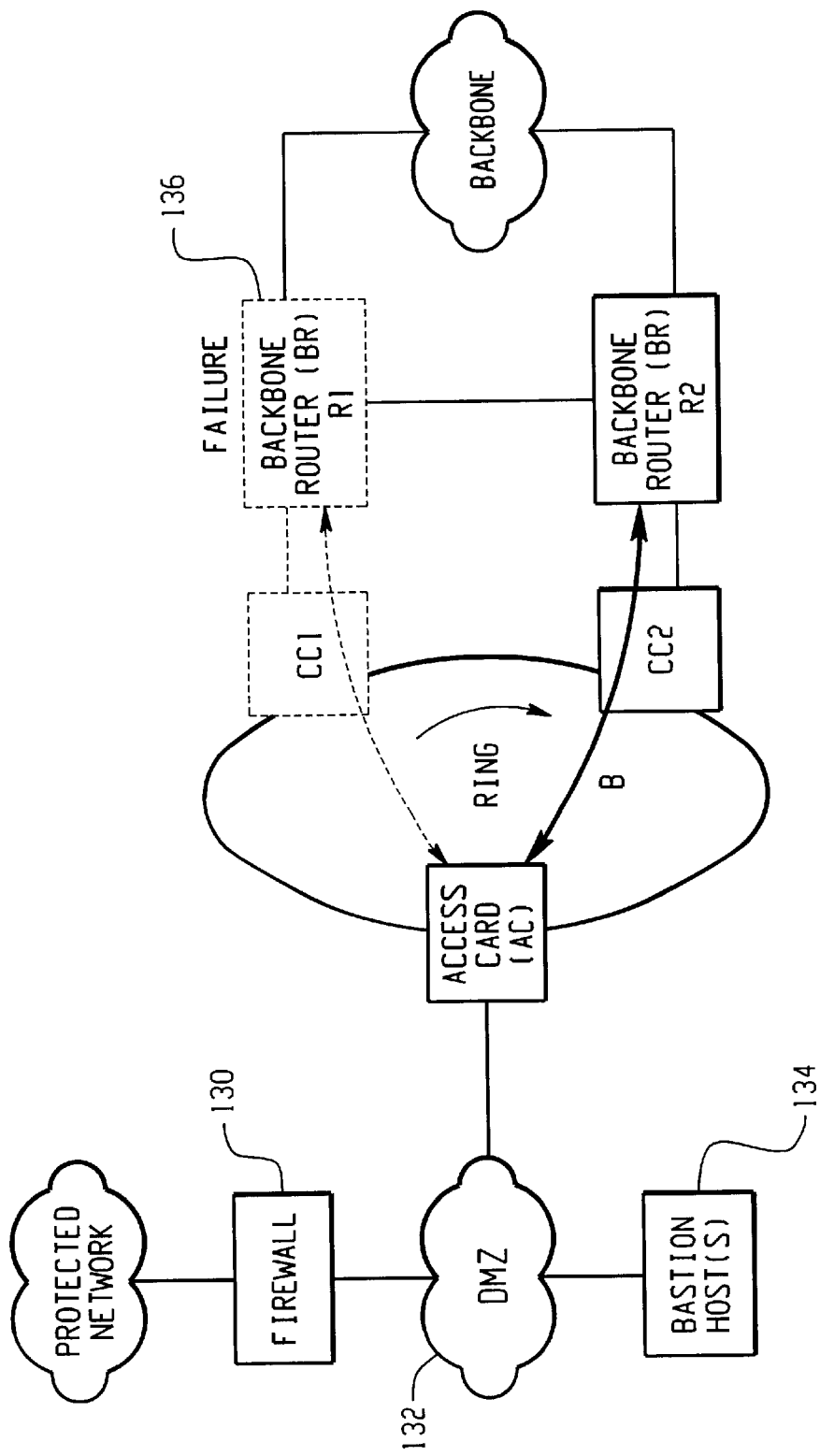
FIG. 21 is a schematic drawing illustrating the use of the present invention with a user network having a firewall.

Illustrated in FIG. 21 is a customer network that utilizes a firewall 130. The network between the firewall and the WAN link is usually referred to as Demilitarized zone 132 ("DMZ"). Bastion hosts 134, such as the WWW server and the mail server, preferably are also coupled to the DMZ 134. The firewall 130 is configured with a default gateway for the upstream traffic. In case of failure of the path to backbone router R1 136, VC switching mechanisms intervenes and the upstream gateway for the firewall changes.

Figure 22:
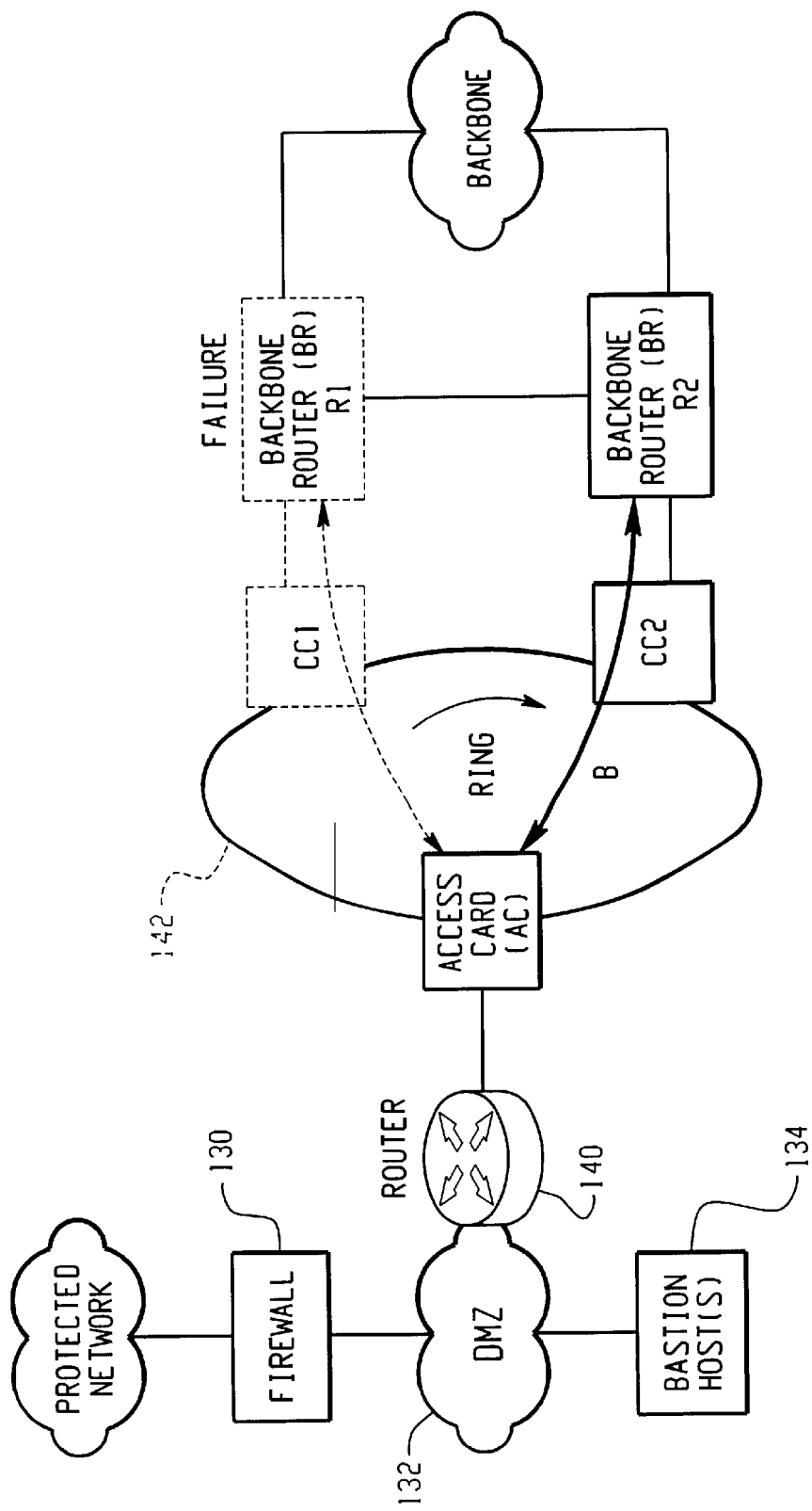
FIG. 22 is a schematic drawing illustrating the use of the present invention with a user network with a screened subnet firewall.

In an alternative embodiment, as shown in FIG. 22, a router 140 is coupled between the DMZ 132 and the ring 142. This configuration is often called "screened subnet". This case is similar to the configuration with a LAN and a single Router connected to the AC.

Having described in detail the preferred embodiments of the present invention, including preferred modes of operation, it is to be understood that this invention and operation could be constructed and carried out with different elements and steps. The preferred embodiments are presented only by way of example and are not meant to limit the scope of the present invention, which is defined by the following claims.

What is claimed:

1. An access device for use in a ring network having a plurality of network nodes coupled together by one or more communication paths wherein a plurality of the network nodes have a concentrator device for directing traffic from one or more of the communication paths to a wide area network outside of the ring network and for directing traffic from the wide area network to one or more of the communication paths in the ring network, the access device comprising:
   a first interface that provides a communication link to a local area network;
   a second interface that provides a communication link to a plurality of ring network communacation paths; and
   an access circuit coupled to the first and second interfaces, wherein the access circuit is operable to direct upstream traffic from the local area network to a wide area network via one or more ring network communication paths and is operable to direct downstream traffic from the wide area network to the local area network, the access circuit being operable to direct upstream traffic to the wide area network via a first concentrator device in the flag network and also operable to direct upstream traffic to the wide area network via a second concentrator device in the ring network, the access circuit using one of the first and second concentrator devices as a working concentrator device and the other as a protection concentrator device, the access circuit choosing the second concentrator device as the working concentrator device upon the access circuit being alerted that a failed condition associated with the first concentrator device had been detected.

2. The access device according to claim 1 wherein the access device is operable to detect a failed condition with the first concentrator device by detecting packet oscillation in the system.

3. The access device according to claim 1 wherein the access device is operable to select the second concentrator device as the working concentrator device when one or more of the following conditions are detected: a failure of the first concentrator device is detected, the access device is commanded to switch the selection of working and protection concentrator devices, a failure of the communication path between the first concentrator device and the wide area network is detected, a failure of a backbone router coupled to the first concentrator device is detected, or a failure of a bridge device coupled to the first concentrator device is detected.

4. The access device according to claim 1 wherein the access device is operable to select the first concentrator device as the working concentrator device and to select the second concentrator device as the protection concentrator device when one or more of the following conditions are detected: the first concentrator device has recovered from a failure, a recovery of the communication path between the first concentrator device and the wide area network is detected, a failure of the second concentrator device is detected, the access device is commanded to switch the selection of working and protection concentrator devices, a failure of the communication path between the second concentrator device and the wide area network is detected, a failure of a backbone router coupled to the second concentrator device is detected, or a failure of a bridge device coupled to the second concentrator device is detected.

5. A ring network comprising:
   a first concentrator device for directing traffic from one or more ring network communication paths to a wide area network outside of the ring network and for directing traffic from the wide area network to one or more ring network communication paths;
   a second concentrator device for directing traffic from one or more ring network communication paths to a wide area network outside of the ring network and for directing traffic from the wide area network to one or more ring network communication paths; and
   an access device having a communication link to a local area network and having a communication link to the wide area network via one or both of the first and second concentrator devices, the access device being operable to direct upstream traffic from the local area network to the wide area network via the first concentrator device and also operable to direct upstream traffic to the wide area network via the second concentrator device, the access device choosing one of the first and second concentrator devices as a working concentrator device and the other as a protection concentrator device, the access circuit choosing the second concentrator device as the working concentrator device upon the access device being alerted that an error associated with a communication pathway serviced by the first concentrator device bad been detected.

6. The ring network according to claim 5 wherein the first concentrator device establishes a communication path with the wide area network by establishing a communication path with one or more router or bridges in the wide area network and the second concentrator device establishes a communication path with the wide area network by establishing a communication path with one or more router or bridges in the wide area network.

7. The ring network according to claim 5 wherein the first concentrator device is operable to execute a failure detection algorithm that is capable of detecting router failures and operable to communicate to the access device that the first concentrator device's communication path to the wide area network is not functioning upon the detection of a router failure.

8. The ring network according to claim 7 wherein the failure detection algorithm makes use of an Open Shortest Path Protocol.

9. The ring network according to claim 7 wherein the failure detection algorithm makes use of a routing internet protocol.

10. The ring network according to claim 7 wherein the failure detection algorithm makes use of a ping application.

11. The ring network according to claim 5 wherein the second concentrator device is operable to detect a failed condition with the first concentrator device and to notify the access device of the failure.

12. The ring network according to claim 5 wherein the access device is operable to detect a failed condition with the first concentrator device by detecting packet oscillation in the system.

13. The ring network according to claim 5 wherein the access device is operable to select the second concentrator device as the working concentrator device when one or more of the following conditions are detected: a failure of the first concentrator device is detected, the access device is commanded to switch the selection of working and protection concentrator devices, a failure of the communication path between the first concentrator device and the wide area network is detected, a failure of a backbone router coupled to the first concentrator device is detected, or a failure of a bridge device coupled to the first concentrator device is detected.

14. The ring network according to claim 5 wherein the access device is operable to select the first concentrator device as the working concentrator device and to select the second concentrator device as the protection concentrator device when one or more of the following conditions are detected: the first concentrator device has recovered from a failure, a recovery of the communication path between the first concentrator device and the wide area network is detected, a failure of the second concentrator device is detected, the access device is commanded to switch the selection of working and protection concentrator devices, a failure of the communication path between the second concentrator device and the wide area network is detected, a failure of a backbone router coupled to the second concentrator device is detected, or a failure of a bridge device coupled to the second concentrator device is detected.

15. The ring network according to claim 5 wherein the network comprises a plurality of network nodes and wherein the access device, the first concentrator device and the second concentrator device are each located at different network nodes.

16. The ring network according to claim 5 wherein the network comprises a plurality of network nodes and wherein the access device and one of said first concentrator device and said second concentrator device are located at the same network node as the access device.

17. A method for transmitting traffic in a ring network having at least two concentrator devices and one access device to a wide area network, comprising the steps of:
providing a first communication path from a local area network (LAN) to a wide area network (WAN) via a first access device and a first concentrator device;
providing a second communication path from the LAN to the WAN via the first access device and a second concentrator device;
transmitting upstream traffic on the first communication path and not on the second communication path;
detecting an error associated with the first communication path;
communicating an error detection signal to the first access device; and
transmitting upstream traffic on the second communication path after receipt by the first access device of the error detection signal.

18. The method according to claim 17 wherein the detecting step comprises the step of detecting a failure in a communication channel between the first concentrator device and the wide area network.

19. The method according to claim 17 wherein the detecting step comprises the step of detecting a failure in the first concentrator device.

20. The method according to claim 17 or 18 wherein the first concentrator device transmits the error detection signal to the access device.

21. The method according to claim 17 or 19 wherein the second concentrator device transmits the error detection signal to the access device.

22. The method according to claim 17 wherein the access device is operable to detect the failure by detecting packet oscillation and is operable to communicate the error detection signal to itself.

23. The method according to claim 17 wherein the first concentrator device is operable to execute a failure detection algorithm that is capable of detecting router failures and operable to communicate to the access device that the first concentrator device's communication path to the wide area network is not functioning upon the detection of a router failure.

24. The method according to claim 23 wherein the failure detection algorithm makes use of an Open Shortest Path Protocol.

25. The method according to claim 23 wherein the failure detection algorithm makes use of a routing internet protocol.

26. The method according to claim 23 wherein the failure detection algorithm makes use of a ping application.

27. The method according to claim 17 wherein the access device transmits upstream traffic on the second communication path when one or more of the following conditions are detected: a failure of the first concentrator device is detected, the access device is commanded to transmit upstream traffic on the second communication path, a failure of the communication channel between the first concentrator device and the wide area network is detected, a failure of a backbone router coupled to the first concentrator device is detected, or a bridge device coupled to the first concentrator device is detected.

28. The method according to claim 17 further comprising the step of switching the communication path used for transmitting upstream traffic from the second communication path to the first communication path.

29. The method according to claim 17 wherein the access device transmits upstream traffic using the first communication path when one or more of the following conditions are detected: the first concentrator device has recovered from a failure, a recovery of the communication channel between the first concentrator device and the wide area network is detected, a failure of the second concentrator device is detected, the access device is commanded to transmit upstream traffic on the first communication path, a failure of the communication channel between the second concentrator device and the wide area network is detected, a failure of a backbone router coupled to the second concentrator device is detected, or a failure of a bridge device coupled to the second concentrator device is detected.

30. The method according to claim 17 wherein the ring network comprises a plurality of network nodes and wherein the access device, the first concentrator device and the second concentrator device are each located at different network nodes.

31. The method according to claim 17 wherein the ring network comprises a plurality of network nodes and wherein the access device and one of said first concentrator device and said second concentrator device are located at the same network node as the access device.

32. A medium for storing a computer-executable program, for use in a ring network having at least two concentrator devices and one access device, the computer executable program effecting a process comprising the steps of:

transmitting upstream traffic on a first communication path from a local area network (LAN) to a wide area network (WAN) via a first access device and a first concentrator device;

transmitting upstream truffle on a second communication path from the LAN to the WAN via the first access device and a second concentrator device when one or more of the following conditions are detected: a failure of the first concentrator device is detected, the access device is commanded to transmit upstream traffic on the second communication path, a failure of the communication channel between the first concentrator device and the wide area network is detected, a failure of a backbone router coupled to the first concentrator device is detected, or a failure of a bridge device coupled to the first concentrator device is detected; and switching the communication path used for transmitting upstream traffic from the second communication path to the first communication path when one or more of the following conditions are detected: the first concentrator device has recovered from a failure, a recovery of the communication channel between the first concentrator device and the wide area network is detected, a failure of the second concentrator device is detected, the access device is commanded to transmit upstream traffic on the first communication path, a failure of the communication channel between the second concentrator device and the wide area network is detected, a failure of a backbone router coupled to the second concentrator device is detected, or a failure of a bridge device coupled to the second concentrator device is detected.

* * * * *

UNITED STATES PATENT AND TRADEMARK OFFICE
CERTIFICATE OF CORRECTION

PATENT NO. : 6,829,215 B2
DATED : December 7, 2004
INVENTOR(S) : Tornar

It is certified that error appears in the above-identified patent and that said Letters Patent is hereby corrected as shown below:

Column 13,
Line 59, change "communacation" to -- communication --

Column 14,
Line 1, change "flag" to -- ring --

Signed and Sealed this

Fifth Day of April, 2005

JON W. DUDAS
*Director of the United States Patent and Trademark Office*